(12) United States Patent
Honda

(10) Patent No.: US 6,300,716 B1
(45) Date of Patent: Oct. 9, 2001

(54) HIGH-INTENSITY DISCHARGE LAMP, HIGH-INTENSITY DISCHARGE LAMP DEVICE, HIGH-INTENSITY DISCHARGE LAMP LIGHTING CIRCUIT AND LIGHTING SYSTEM

(75) Inventor: Hisashi Honda, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 09/453,706

(22) Filed: Dec. 3, 1999

(30) Foreign Application Priority Data

Dec. 4, 1998 (JP) .................................................. 10-345065
Aug. 30, 1999 (JP) .................................................. 11-243395

(51) Int. Cl.[7] .................................................. H05B 41/00
(52) U.S. Cl. .............................. 315/51; 315/58; 315/71; 313/113; 313/491; 313/493
(58) Field of Search ..................... 315/51, 71, 72, 315/248, 56, 58; 313/493, 634, 573, 113, 491

(56) References Cited

U.S. PATENT DOCUMENTS 5,256,940  * 10/1993  Wada et al. ............................ 315/248

* cited by examiner

Primary Examiner—David Vu

(57) ABSTRACT

An enhanced high-intensity discharge lamp and enhanced lighting device using the lamp, wherein feed-conductor is coupled being without off-centered and/or a discharge lamp light-transmissive ceramic enclosure and the feed-conductor is sealed at a high-reliability, are provided. The coil portion in formed on the sealable portion of the feed-conductor, to which the refractory portion and the outer protrusion of the sealable portion are inserted to be coupled. The feed-conductor is inserted into the light-discharge lamp light-transmissive ceramic enclosure from the small diameter cylinder portion, then the gap between the sealable portion and the inner surface of the small diameter cylinder portion is sealed by the sealant of the ceramic sealing compound. When the ceramic sealing compound which has melted in the sealing operation enters into the interior of the mid-portion of the coil portion and then it is solidified therein, a thick sealant film is formed inside the coil portion. Accordingly the sealing reliability is remarkably enhanced.

9 Claims, 23 Drawing Sheets

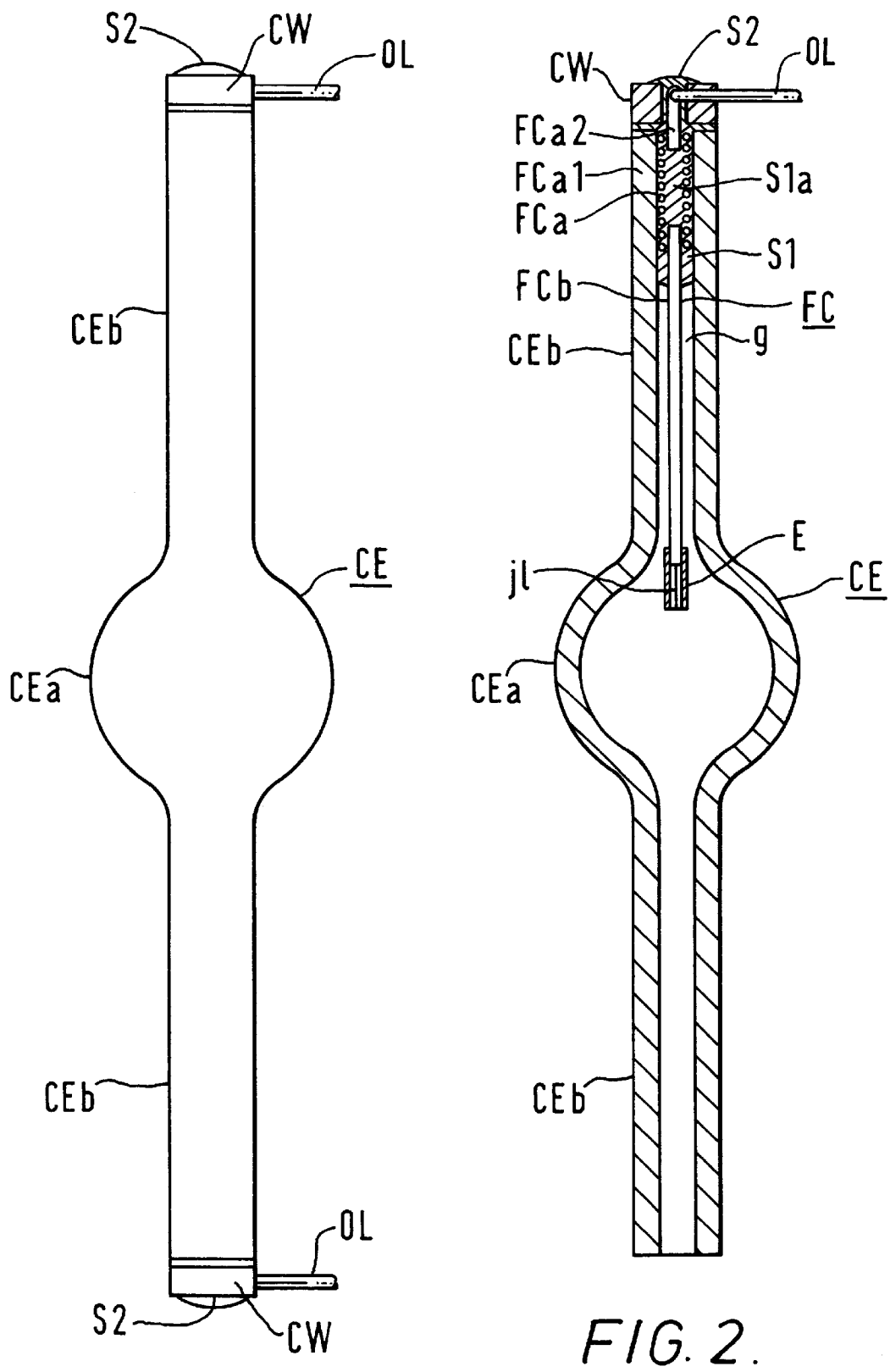

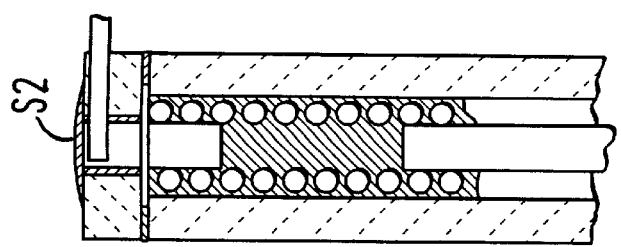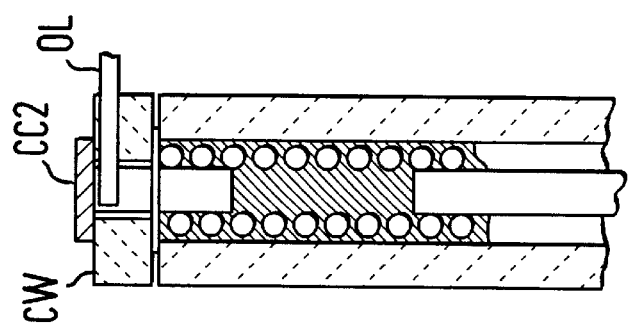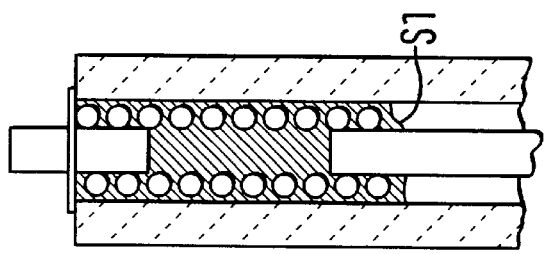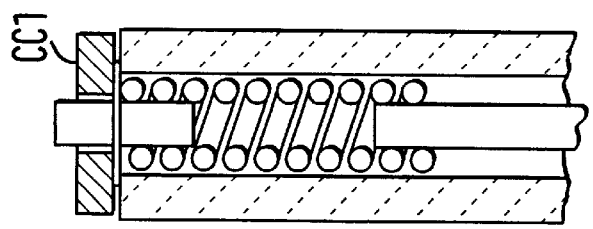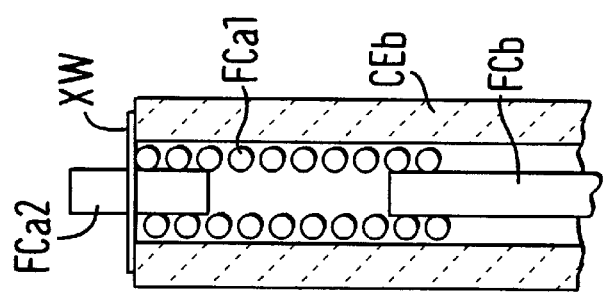

HIGH-INTENSITY DISCHARGE LAMP, HIGH-INTENSITY DISCHARGE LAMP DEVICE, HIGH-INTENSITY DISCHARGE LAMP LIGHTING CIRCUIT AND LIGHTING SYSTEM

FIELD OF THE INVENTION

The present invention relates to a high-intensity discharge lamp which is provided with a discharge lamp enclosure made of light-transmissive ceramics, a high-intensity discharge lamp utilizing the high-intensity discharge lamp, a lighting circuit for the high-intensity discharge lamp, and a lighting device.

BACKGROUND OF THE INVENTION

Recently, a high-intensity discharge lamp provided with a light-transmissive ceramic enclosure which is more profitable in its life-expectancy and lighting efficiency than a conventional discharge lamp silica glass enclosure.

FIG. 30 is a partial enlarged front section showing a sealing portion of a high-discharge lamp provided with a conventional light-transmissive ceramic enclosure.

FIG. 31 is another partial enlarged front section showing a sealing portion of a conventional high-discharge lamp.

In FIGS. 30 and 31, the numeral 101 denotes a small diameter cylinder portion. Also, the numeral 102 denotes a feed-conductor, and the numeral 103 denotes a sealant.

The small diameter cylinder portion 101 is coupled to one end of an envelope (not shown) defined in the center of a discharge lamp light-transmissive ceramic enclosure. While the small diameter cylinder portions 101 is defined a through-holes 101a which communicates to the envelope.

The feed-conductor 102 is provided with a sealable portion 102a and a refractory portion 102b.

The sealable portion 102a is comprised of a sealable portion 102a1 which may be inserted in the small diameter cylinder portion 101, and an outer protrusion 102a2 having a tip end to be coupled to the base end of the sealable portion 102a1 and a base end protruding outside the small diameter cylinder portion 101.

The base end of the refractory portion 102b is coupled to the tip end of the sealable portion 102a made of the sealable metal. Further an electrode is mounted on the tip end of the refractory portion 102b (not shown). In order to couple the base end of the refractory portion 102b to the tip end of the sealable portion 102a, steps 102a3 and 102b1 are placed on, e.g., the tip end of the sealable portion 102a and the base end of the refractory portion 102b at their positions to be welded each other. The steps 102a3 and 102b1 are superimposed and then spot-welded each other up and down.

Further, the feed-conductor 102 is inserted into the small diameter cylinder portion 101. Then a compound of a sealant 103 for sealing ceramics flows into the narrow gap between the small diameter cylinder portion 101 and a sealing portion 101a1 of the sealable portion 102a of the feed-conductor 102 inserted in the small diameter cylinder portion 101 and then solidified so that the small diameter cylinder portion 101 is sealed and the feed-conductor 102 is fixed to a predetermined position, By the way, the outer protrusion 102a2 of the sealable portion 102a of the feed-conductor 102 protrudes outside and its tip end is coupled to the bane end of the sealable portion 102a1. In a type of a outer bulb being housed in an exhausted outer bulb and lighting therein, the outer protrusion 102a may protrude outside the discharge lamp light-transmissive ceramic enclosure 101 and effect as an external lead-wire. However, in a type of a outer bulb exposing in air, the outer protrusion 102a must be sealed hermetically by the sealant so as not to be exposed in air for preventing from oxidation.

Accordingly, in the type of the outer bulb exposing in air, the outer protrusion 102a2 is coupled to an external lead-wire (now shown) made of an oxidation-resistant metal, and the junction is fit around by the ceramic washer (not shown), and sealed by a sealant with a melting point lower than that of the sealant 103.

Further, for coupling the tip end of the outer protrusion 102a2 to the base end of the sealable portion 102a1, steps 102a4 and 102a5 defined in the sealable portion 102a1 and the outer protrusion 102a2 are superimposed each other and then spot-welded.

To solve the problems in the prior art discharge lamp as described above, the inventors have developed a new high-intensity discharge lamp in which the sealable portion of the feed-conductor is formed by rounding a plate in a cylindrical shape with a junction line and filed the invention (hereinafter referred to prior invention) in Japan (Japanese Patent Application 10-257807). Accordingly the sealable portion becomes easy to be coupled to a refractory portion whose tip end being provided with an electrode. The sealable portion then becomes hard to be off-centered from the refractory portion.

FIG. 32 is a partial enlarged front section showing the prior invention of the high-intensity discharge lamp.

In FIG. 32, the same elements as those shown in FIG. 31 are assigned with same marks.

The sealable portion 102a of the feed-conductor 102 is comprised of a cylindrical sealable portion 102a1' and an outer protrusion 102a2.

The cylindrical sealable portion 102a1' is formed by cylindrically rounding a sealable metal plate. Thus the cylindrical sealable portion 102a1' has an axially extending junction line j which presents a narrow gap of about 1 to 10 $\mu$m in average.

The outer protrusion 102a2 is inserted into the cylindrical sealable portion 102a1'. They are thus possible to be coupled each other by a shrinkage fitting at the sealing operation.

The refractory portion 102b is inserted into the cylindrical sealable portion 102a1', and then coupled thereto by a shrinkage fitting in the same way as that of the outer protrusion 102a2.

By the way, the conventional arts have same drawbacks at the junction of the sealable portion and the refractory portion in the feed-conductor, and at the junction of a sealing and the outer protrusion in the sealable portion. That is, there are problems of that such a spot welding is troublesome and that those thus spot-welded are easy to be off. centered from each other.

The prior-art high-intensity discharge lamp is favorable in that it is easy to couple the sealable portion and the refractory portion and they are hardly off-centered from each other. However, when taken a configuration that the sealant fails to enter inside the cylindrical sealable portion 102a1', if it Leaks of the sealant occur at both the junction of the refractory portion and the cylindrical sealable portion 102a1' and the junction of the cylindrical sealable portion 102a1' and the outer protrusion 102a2, the discharge lamp light-transmissive ceramic enclosure 101 looses a hermeticity. However, such a problem could be solved in easy according to the present invention.

SUMMARY OF THE INVENTION

The present invention has an object to provide an enhanced high-intensity discharge lamp, an enhanced high-intensity discharge lamp device, an enhanced high-intensity discharge lamp lighting circuit, and an enhanced lighting device using the lamp, in which feed-conductors fail to be off-centered from the refractory portions, and/or that they present high-reliability of sealing between the discharge lamp light-transmissive ceramic enclosure and the feed-conductor Further, the present invention has another object to provide a high-intensity discharge lamp device in which the high-intensity discharge lamp would not be reduced its life-expectancy even if a shallow reflector is utilized.

Furthermore, the present invention has still another object to provide a compact high-intensity discharge lamp lighting circuit and a lighting system using the discharge lamp lighting circuit which is able to be miniaturized by using the stabilizer capable of starting the lighting operation by its load characteristics similar to that of a fluorescent lamp stabilizer, and which presents a relatively low blackening level, i.e., blackening due to an evaporation of an electrode material at a glow-arc transition.

A high-intensity discharge lamp according to the invention of claim 1 includes;

- a discharge lamp light-transmissive ceramic enclosure having an envelope defining a discharge space and a small diameter cylinder portion communicating with the envelope and having a diameter smaller than the envelope;
- a feed-conductor, which is comprised of a sealable portion including a coil portion, and a refractory portion coupled to the coil portion by inserting its base end into the coil portion, the feed-conductor being inserted into the small diameter cylinder portion of the discharge lamp light-transmissive ceramic enclosure, thus resulting narrow gaps for both the refractory portion and the small diameter cylinder;
- an electrode mounted on the end of the refractory portion of the feed-conductor;
- a sealant for sealing gaps between the small diameter cylinder portion of the discharge lamp light-transmissive ceramic enclosure an& the sealable portion of the feed-conductor so that at least the sealable portion fails to be exposed to the discharge space;
- an ionizing agent filled in the discharge lamp light-transmissive ceramic enclosure.

In the following descriptions, some definitions and their technical meanings are presented for following specific terms, unless otherwise specified.

Light Transparent Ceramic Discharge Closure

The term, "discharge lamp light-transmissive ceramic enclosure" means a hermetic discharge lamp enclosure comprised of a monocrystalline metal oxide, e.g., a saphire, a polycrystalline metal oxide, e.g., a semi-transparent aluminum oxide, an yttrium-aluminum garnet (YAG), an yttrium oxide (YOX and a polycrystalline nonoxidic material, e.g., a material having a light-transmissivity and a heat-resistancy like an aluminum nitride (AIN). Here, the term; light-transmissivity means a transmissivity allowing a light generated by a discharge to pass through outside a discharge lamp enclosure. Accordingly the term may represent either a transparency or a light-diffusiveness.

Further, the discharge lamp light-transmissive ceramic enclosure holds thereto an envelope defining a discharge space and an electrode, and a small diameter cylinder portion having a narrow gap for sealing the discharge lamp light-transmissive ceramic enclosure together with a feed-conductor. The discharge lamp light-transmissive ceramic enclosure could be formed into a double closed-ends structure with a pair of small diameter cylinder portions coupled to both the ends of the envelope or a single closed-end structure with a small diameter cylinder portion coupled to one end of the envelope.

Further, in making the discharge lamp light-transmissive ceramic enclosure in the case of the double closed-ends structure, a pair of small diameter cylinders may be coupled to both ends of a centrally-located envelope, so as to integrate them together from the outset. Further, it is also able to form an integrated discharge vessel by, e.g., preparing a cylinder forming an envelope, and provisionally sintering individuals of a pair of end plates to be fit to both ends of the cylinder to close the cylinder and a pair of small diameter cylinders to be fit into central holes defined in the end plates to work as the small diameter cylinder portions, and then sintering whole of them after fitting the small diameter cylinders to both end of the former cylinder.

In the case of a single closed-end structure, though the whole elements is able to be formed integrally from the outset in the manner the same as the double closed-ends structure, individuals of a globe with an opening or a bottom-closed cylinder containing an opening and a cylinder for forming the small diameter cylinder portion are provisionally sintered, and then fitting them desirably, and lastly sintering whole of them to integrate. Further, the small diameter cylinder portion could be made a single piece shared by a pair of electrodes, or alternatively it in also possible to prepare a pair of small diameter cylinder portions. Here, when mounting the common piece small diameter cylinder portion, upon an intermediate ceramic cylinder defined a pair of through-holes inserted into a small diameter portion, and a pair of feed-conductors are inserted into the through-holes of the intermediate cylinder, and then sealed desirably, a required distance is ensured between the feed-conductor and the electrode.

Furthermore, the interior volume of the discharge lamp light-transmissive ceramic enclosure in particularly effective at a small volume of less than 0.05 cc, or preferably less than 0.04 cc. But it is not necessarily limited to the specific volume. Such a compact discharge lamp light-transmissive ceramic enclosure is able to be made in length less than 30 mm, or preferable less than 25 mm. Further it is preferable to set the lamp to have a rated power consumption less than 20 W.

Feed-conductor

The feed-conductor is used to at least one of the small diameter cylinder portions of the discharge lamp light-transmissive ceramic enclosure.

The "feed-conductor" works for applying a voltage across the electrode via a stabilizer from a power supply, and for starting the high-voltage discharge lamp to operate, and for lighting the discharge lamp by introducing a current thererto. The feed-conductor is mounted to the small diameter cylinder portion of the light-transmissive ceramic discharge lamp in sealed hermetically by means as described below.

The "Sealable portion" may be made of a material which is suitable for sealing the discharge lamp light-transmissive ceramic enclosure at a gap between the small diameter cylinder portion and the sealable portion. If needed, further, the sealable portion could be made a material suitable for seating by interposing a pipe-shaped intermediate ceramic member (so-called as a ceramic pipe) between the small diameter cylinder portion and the sealable portion, e.g., a niobium, a tantalum, a titanium, a zirconium, a hafnium and a vanadium.

In a case of using an aluminum oxide as the material of the discharge lamp light-transmissive ceramic enclosure, since the niobium and the tantalum have almost same average thermal expansion coefficient as that of the aluminum oxide, they are suitable for the sealable portion. In case of using the yttrium oxide (YOX) and the yttrium-aluminum garnet (YAG), there is no significant difference in their thermal expansion coefficients. In case of using the aluminum nitride, it is better to use the zirconium as the material of the sealable portion.

Further, the sealable portion is provided with the coil portion on its tip end. Accordingly, it is possible to couple the sealable portion and the refractory portion together without being off-centered from each other by a shrinkage fitting in a sealing operation, by simply inserting the base end of the refractory portion into the coil portion If needed, however, they in able to be welded together after inserting the refractory portion into the coil portion. Of course, they are hardly off-centered from each other according to the welding operation.

Further, the tip end of the sealable metal rod which is inserted in the coil portion of the sealable portion fits in a face-to-face manner to the base end of the refractory portion. Accordingly the coil portion and the refractory portion is able to be combined in more correct straight alignment.

Further, the entire of or a part of the coil portion of the sealable portion could have a desired coil pitch. For instance, if the coil portion is tight-wound, a sealant described after takes somewhat a time to enter into the interior of the coil portion, but the entire of the feed-conductor could be coupled to the coil portion in a straight alignment.

Further, by enlarging the pitch a required length of the wire of the coil could be reduced.

Further, by extending the coil portion of the sealable portion to make the principal part of the sealable portion, i.e., portions other than a portion to be coupled to the refractory portion, the sealant of the ceramic sealing compound is able to enter inter the interior of the coiled principal part of the sealable portion and then form a thick sealing film.

Furthermore, in the case of adding an outer protrusion which constitutes a part of the sealable portion and protrudes outside the sealant, it is able to use an outer protrusion made of a sealable metal independently to the coil portion, or to couple an external lead-wire made of a sealable metal directly to the principal part of the sealable portion, instead of using such an independent outer protrusion. In order to easily realize them, the independent outer protrusion or a portion of the sealable portion to be coupled to the external lead-wire is able to be constituted by the coil portion. Accordingly, it becomes easy to couple the independent outer protrusion or the external lead-wire to the principal port of the sealable portion without being off-centered from each other.

Further, the mid-portion of both ends of the coil portion is able to be made of a solid rod or a cylinder made of a sealable metal. In this case, it is able to insert intermediate members into the coil portions on both sides and then couple them together by a shrinkage fitting in the sealing operation or a welding.

Furthermore, the entire of the sealable portion including the coil portion which will become the tip end of the sealable portion for connecting the refractory portion, the mid-portion for constituting the sealing portion by being inserted the sealant therein, and the independent outer protrusion or the other end to be coupled with the external lead-wire, is constituted by the coil portion. In this case, the coil portions are able to be formed in integral by coils with the same wire, the same diameter and the same pitch with each other. Or coils different at a part of or whole of the dimensions are individually formed and then coupled together.

For example, both ends of the coil portion are tight-wound, while its mid-portion will be roughly wound. According to such a configuration, it is easy to form the sealable portion by the sealant entering in the interior of the mid-portion, and also easy to surely couple the members together on both ends. Further, enlarging the coil pitch at the mid-portion, the length of the wire of the coil will be reduced.

To shape the coil as mentioned above, the tight-wound coil or the coil with narrow gaps between turns is prepared at first. Both ends of the coil are coupled to predetermined members, and the mid-potion of the coil is stretched to a predetermined length. As a result, a roughly wound coil pitch portion is formed in the mid-portion. However, it is able to use a coil having three sections wound in different pitches from the outset.

Further, it is also able to use a coil with a constant pitch across the entire of the coil length but leaving a fixed gap between coil-turns from the outset.

Further, by inserting a sealable metal rod in the interior of the coil portion, it is possible to prevent the coil portion from curving undesirably. In this case, by making the tip end of the rod fit in a face-to-face manner to the base end of the refractory portion it becomes easy to couple the refractory portion in a straight alignment. Further, by making the base end of the rod to protrude outside from the coil portion of the small diameter cylinder portion, the rod is able to be used as the outer protrusion.

Further, in came of coupling an additional external lead-wire to the outer protrusion of the sealable portion in the type of the outer bulb exposing in air, or the outer protrusion of in the type of the outer bulb being housed in an outer bulb, it is able to integrate the outer protrusion with the coil portion by extending the coil portion. Accordingly, it is able to save other parts used as the outer protrusion, and time and effort for coupling them.

The "refractory portion" is a portion comprised of a conductive material which has a high melting point sufficient to resist the high temperature during the operation of the high-intensity discharge lamp. The term also indicates a portion of a conductive material which has a corrosion-resistance to an ionizing agent residing in the discharge lamp light-transmissive ceramic enclosure. For example, it is able to be made by tungstens, molybdenuns, alloys including either of them as a principal element, or platinum. However, it is able to be made by combining above-described several metals, not a single kind of metal alone. Furthermore, it may be made a cermet.

Further, the refractory portion may be a solid rod or a cylinder, i.e., a pipe having a 10 to 300 $\mu$m thickness. In a compact high-intensity discharge lamp such as a lamp with a rated power consumption less than 30 W. or more preferably, about 20 W, a solid rod type refractory portion in appropriate to have a diameter leas than 0.2 mm. While a cylinder type refractory portion is appropriate to have a thickness of about 10 to 100 $\mu$m Furthermore, the cylinder type refractory portion may be a cylinder manufactured by cylindrically rounding a thin plate thus leaving a narrow gap junction, as well as a seamless pipe. Thus, when a sealant has been adhered to the base end of the refractory portion, the cylinder type refractory portion is able to absorb a stress caused by a thermal expansion difference between them of the refractory portion and the sealant, even if the thermal expansion coefficient of the sealant is apparently smaller then that of the refractory portion.

On the other hand, a narrow gap, so called a capillary, is formed between the refractory portion and the inner surface of the smell diameter cylinder portion. A part of the narrow gap at the side of one end of the small diameter cylinder portion is buried by the sealant. However, in other parts of the narrow gap at the side of the sealant a rest of the ionizing agent stays in a liquid-phase during the lighting of the lamp. Then, the liquid-phase ionizing agent at the side of the discharge space presents a coldest portion. Accordingly, it is able to set desirably the temperatures of the coldest portion and the sealant, by suitably setting the width and the length of the narrow gap and the quantity of the ionizing agent.

Electrode

The electrode is mounted on the tip end of the refractory portion of the feed-conductor. Generally the electrode is located inside the envelope of the discharge lamp light-transmissive ceramic enclosure. However, such a requirement of locating the electrode is not essential, but the electrode may be located in the interior of the small diameter cylinder portion That is, the electrode may be located at a position facing the envelope.

Further, if desirable the electrode could be integrated with the refractory portion of the feed-conductor, other than it had been separated from the refractory portion. For example, it is allowable that the tip end of the refractory portion works as the electrode. In this case, although in an AC type lamp it is able to integrate a pair of electrodes with refractory portions& in a DC type lamp only a cathode is able to be integrated with such I refractory portion. However, in the DC type lamp an anode in constituted as a different piece mounted on tie tip end of the refractory portion.

Further, the electrode is able to be formed by cylindrically rounding a plate made of a tungsten, etc. Accordingly, a surface area of the electrode increases so that the electrode surface current density, which is one of factors determining a ratio of sputtering at the glow discharge mode in the glow-arc transition, decreases. Accordingly, a cathode voltage drop in also decreased, so as to reduce the sputtering. Since the thermal capacity decreases, the glow-arc transition time is shortened. Further, due to an edge effect an electron emission efficiency is enhanced so as to decrease the starting voltage.

Furthermore, when the discharge lamp light-transmissive ceramic enclosure is of a type of one side sealing, base portions of a pair of electrodes which protrude into the envelope of the discharge lamp light-transmissive ceramic enclosure are able to be covered by an insulating sleeve so as to enhance an electric strength of the space between the base ends of the electrodes.

Sealant

The sealant seals the space between the sealable portion of the feed-conductor and the small diameter cylinder portion of the discharge lamp light-transmissive ceramic enclosure by covering the tip end of the sealable portion so as that at least the sealable portion fails to be exposed to the discharge space.

The sealant is made of a ceramic sealing compound whose melting point is generally higher than 1500° C., and whose thermal expansion coefficient is close to that of the light-transmissive ceramic, in order to seal the feed-conductor and the discharge lamp light-transmissive ceramic enclosure that will be heated to a high temperature during the lighting operation. The ceramic sealing compound, which is often called as a flit, is shaped in a ring pallet by forming a pre-blended vitric material. The pellet is then placed on the tip end of the small diameter cylinder portion of the discharge lamp light-transmissive ceramic enclosure and sintered to be melted so as that its solution enters into the narrow gap between the small diameter cylinder portion and the feed-conductor then hardened at the position. As a result, the sealant is formed on a specific position.

That is, in order to form the sealant on a predetermined position, first the discharge lamp light-transmissive ceramic enclosure is fixed on a portion to be sealed, then the solid ceramic sealing compound is placed on the tip end to be sealed of the small diameter cylinder portion and then heated. Then, the ceramic sealing compound melts and then enters into the gap between the small diameter cylinder portion and the cylindrical sealable portion. When its solution reaches a predetermined position on the middle of the refractory portion the solution undergoes cooling. Accordingly, the sealant is hardened in order to not only cover the sealable portion for preventing the sealable portion from its exposure to the discharge space of the discharge lamp light-transmissive ceramic enclosure, but also seal the gap between the small diameter cylinder portion and the salable portion. At the same time, the sealant seals a part of the gap between the small diameter cylinder portion and the refractory portion hermetically. According to the sealant thus formed, the feed-conductor is fixed to a predetermined position, and also the discharge lamp light-transmissive ceramic enclosure is sealed. In case of a compact high-intensity discharge lamp, it is able to cover the refractory portion of the feed-conductor covered by the sealant across the extent of 0.2 to 0.3 mm in the axial direction If the extent covering the refractory portion is less than 0.2 mm the sealable portion is easily eroded by an ionizing agent such as a halogen. Also, if the extent exceeds 9 mm it is easy to cause a crack on the lamp operation, Ionizing agent In the present invention, the ionizing agent does not have a limited selection.

When using a mercury or rare gases as the ionizing agent, a high-intensity mercury-vapor discharge lamp (so-called a mercury lamp) is able to be achieved.

Further, by filling a metal halide including at least a metal for radiating light, a high-intensity metal halide discharge lamp (so-called a metal halide lamp) is able to be achieved. In this case, a mercury and a proper pressure of a rare gas are filled in a discharge lamp vessel as a buffer agent.

Further, in the metal halide lamp, by filling proper pressure of a neon Ne and an argon Ar in the discharge lamp vessel as buffer gases, the metal halide lamp is able to be favorably lighted in using a high frequency stabilizer which is as compact as the fluorescent lamp stabilizer and a load characteristics smoothly extending from the second-order open-circuit voltage to the second-order short-circuit current, without using an igniter.

Further, as a halogen for constituting the metal halide, it is able to use one or a plurality from an iodine I, a bromine Br, a chlorine Cl and a fluorine F. The metal halide of a metal for radiating light is able to be selected from a group of known metal halides, in order to achieve a radiation provided with a desired lighting characteristics about a light color, an average color rendering evaluation index Ra and a lighting efficiency, and further in response to the size and the input power of the discharge lamp light-transmissive ceramic enclosure. For instance, one or a plurality of halides selected among a group of a Na-halide, a Li-halide, an Sc-halide or rare-earth metal-halides could be used.

Further, in the high-intensity metal halide discharge lamp, a halide of a metal having a relatively high vapor pressure and less radiative or non-radiative visible lights, such as an aluminum Al is able to be filled in the discharge vessel, in place of the mercury. As a rare gas, an argon Ar, a xenon Xe, or a neon Ne could be used On the other hand, by using a sodium amalgam NaHg as the ionizing agent together with a rare gas such as a xenon Xe, a high-intensity sodium discharge lamp in able to be achieved.

Other Configurations

At the implementation of the present invention, following configurations are able to be added as needed. However, such configurations are optionally and selectively adopted. When such configurations are adopted, the high-intensity discharge lamp could exert distinctive features. But they do not limit the technical range of the present invention.

(1) Narrow Gap

The width of the narrow gap between the inner surface of the small diameter cylinder portion and the feed-conductor is not limited in the present invention. However, in case of a relatively compact high-intensity discharge lamp, i.e., discharge lamp light-transmissive ceramic enclosure having an interior volume of less than 0.1 cc, or preferably less than 0.05 cc and/or a rated power consumption less than 20 W it is preferred that the width of the narrow gap is equal to or larger than 0.21 mm.

According to studies of the inventors, in the compact high-intensity discharge lamp, it is found that it is unable to obtain a favorable discharge lamp even if the size of the conventional discharge lamp had been proportionally reduced. That is, in case of the lighting power being reduced, it is necessary to ensure a proper temperature for the coldest portion to ensure a sufficient lighting efficiency. To this end, it is indispensable to decrease the thermal capacity of the entire of the discharge lamp light-transmissive ceramic enclosure. However, if simply decreasing the size of the discharge lamp light-transmissive ceramic enclosure according to a thoughtcast in case of a relatively large lighting power, it will cause a leak at the sealable portion in a short time of lighting operation. The reason is considered that when decreasing the size of the discharge lamp light-transmissive ceramic enclosure, a configuration of thermal conduction from heating elements including a discharge plasma, i,e., a balance of a thermal conduction, a thermal convection and a thermal radiation collapse.

(2) Relationship Between the Interior Volume of the Discharge Lamp Light-transmissive Ceramic Enclosure and its Linear Transmittance.

In ease of the interior volume of the discharge lamp light-transmissive ceramic enclosure being less than 0.1 cc, or preferably less than 0.05 cc, the average linear transmittance of the envelope is set to 20% or more, and preferably to 30% or more.

It is assumed that the linear transmittance is measured in a wavelength of 550 nm. Here, the average linear transmittance means an average value of the linear transmittance data measured at different five sampling points.

In the case of the light transparence ceramic discharge enclosure having small interior volume as mentioned above, if the average linear transmittance of its envelope is 20% or more, it is able to enhance not only the optical efficiency (overall apparatus optical efficiency) including that of an optical system such as a reflector to be combined with the discharge lamp, but also to reduce occurrences of the cracks in the discharge lamp light-transmissive ceramic enclosure.

Here, the interior volume of the discharge lamp light-transmissive ceramic enclosure is measured in a following way. First, the enclosure is submerged in water to fill the water in the enclosure. Then the enclosure is drawn out from water after the openings of both the small diameter cylinder portions having been closed. Then the volume of the water in the enclosure is metered and measured.

(3) The Overall Length of the Discharge Lamp Light-transmissive Ceramic Enclosure is Made Less Than 30 mm.

(4) Outer Bulb

In the present invention, the high-intensity discharge lamp could be configured to a type of a lighting bulb being housed in an outer bulb which is evacuated and filled with inert-gas. According to the discharge lamp light-transmissive ceramic enclosure being accommodated in the outer bulb, the temperature of the coldest portion could be easily kept in a desirable high temperature.

Here, the external lead-wire coupled to the base end of the sealable portion of the feed-conductor and exposing outside the discharge lamp light-transmissive ceramic enclosure may be made of either a metal the same as that of the sealable portion or an oxidation-resistant conductor (5) Second Sealant When a part of the sealable portion of the feed-conductor is placed outside the discharge lamp light-transmissive ceramic enclosure as the outer protrusion, the outer protrusion could be covered by the second sealant so as not to be exposed outside.

This configuration is effective for the type of the outer bulb exposing in air.

Further, since the outer protrusion is covered by the second sealant it is possible to prevent to damage or weaken the former sealant (hereinafter the former sealant is referred as the first sealant) for searing of the discharge lamp light-transmissive ceramic enclosure.

Further, when the sealable portion of the feed-conductor is constituted to have a coil portion at its base end, the outer protrusion is able to be formed by a sealable metal rod so as that the rod is inserted in the coil portion and then coupled thereto.

Furthermore, by adding an oxidation-resistive metal to the outer protrusion and exposing the oxidation-resistive metal in air through the second sealant, the oxidation-resistive metal could work as the external lead-wire. Further, when extending the coil portion at the base end of the sealable portion, the coil portion could work as the outer protrusion.

Furthermore, the extent between the coil portions of the tip end and the base end of the sealing portion is able to be formed integrally by the coil portion. If needed, however, the coil portions of the tip end and the base end of the sealing portion may be communicated via a rod or a pipe.

The second sealant must be the one whose thermal expansion coefficient is close to that of the sealable portion of the external lead-wire or the feed-conductor, and also whose melting point is substantially lower than that of the first sealant. For instance, since the melting point of the second sealant is lower than that of the first sealant by 300° C. or more, when the second sealant is formed by heating and melting the ceramic seating compound it is hard to cause the distortion on the first sealant that had been already formed. Accordingly it is also hard to cause the crack on the first sealant.

Further, since the second sealant have the melting point lower then that of the first sealant by 300° C. or more, the melting point of the second sealant is also lower than that of platinum. Thus a considerably inexpensive sealable metal is able to be used for the external lead-wire.

Accordingly, it is possible to lower the coat of the high-intensity discharge lamp.

However, if the second sealant have a melting point lower than that of the first sealant by 400° C. or more, it is more hard to cause the distortion on the first sealant. Accordingly the sealing by the second sealant would become easy.

For the second sealant, the following materials would be preferable. That is, since the second sealant is constituted by an oxide of at least three or more elements selected from a group of Si, B, Pb, Na, Ba, Zn, Ca and Mg, as a principal element, the second sealant is easy to have a low melting point is low and a thermal expansion coefficient close to that of the sealable portion of the feed-conductor. Accordingly, the sealable metal having the lower melting point could be used for the external lead-wire.

Table 1 lists up materials, compositions, melting points and thermal expansion coefficients of the second sealant. Here, all the materials are available from Nippon Denki Glass. Co. Ltd.

TABLE 1

| No. | Glass-Cord | Composition | Melting Point ° C. | Coefficient of Thermal Expansion $\times 10^{-6}/°$ C. |
|---|---|---|---|---|
| 1 | GA-1 | PbO—B2O3—SiO2 | 788 | 6.0 |
| 2 | GA-4 | Na2O—B2O2—SiO2 | 767 | 6.3 |
| 3 | GA-8 | PbO—B2O2—SiO2 | 557 | 8.1 |
| 4 | GA-9 | PbO—B2O2—SiO2 | — | 9.0 |
| 5 | GA-11 | PbO—BaO—SiON2 | — | 8.8 |
| 6 | GA-12 | Na2O—B2O3—ZnO | 687 | 7.3 |
| 7 | GA-13 | CaO—BaO—SiO2 | 1045 | 6.6 |
| 8 | GA-44 | MgO—B2O2—SiO2 | 850 | 11.7 |
| 9 | GA-60 | MgO—B2O2—SiO2 | 850 | 9.6 |

The second sealant would be desirable to have a thermal expansion coefficient from $6\times10^{-6}/°$ C. to $12\times10^{-6}/°$ C., and a melting point lower than 1200° C.

Further, if the external lead-wire is a sealable alloy containing an Fe and an Ni, the external lead-wire could have a low melting point, an oxidation-resistance, a conductivity, and a low cost. For example, an Fe—Ni—Co alloy, in Fe—Ni—Cr alloy etc. are useful for the external lead-wire. These alloys present a favorable wettability for a solution of the sealant and a thermal expansion coefficient falling in a tolerance.

Further, the sealant also covers to seal the tip end of the external lead-wire coupled to the outer protrusion simultaneously, for covering the protrusion of the sealable portion.

Furthermore, if needed, in order to cover the outer protrusion of the sealable portion and the tip end of the external lead-wire by the second sealant, the outer surface of the portion to be sealed is able to be fit around by the ceramic washer, so an that the second sealant is filed inside the ceramic washer.

The external lead-wire may be led in the axial direction or the direction orthogonal to the axis of the discharge lamp light-transmissive ceramic enclosure.

In case of defining the high-intensity discharge lamp on the reflector, at least one end of the external lead-wire extends to the direction orthogonal to the axis of the discharge lamp light-transmissive ceramic enclosure. In the conventional art, the external lead-wire is bent in the right angle. In such a case, since the external lead-wire is bent, a dead space in generated in the axial direction of the high-intensity discharge lamp around the bent portion, so as to disturb the minituarization of the lamp device.

However, when one end of the external lead-wire is coupled by crossing to the discharge lamp light-transmissive ceramic enclosure, it does not cause such a dead space since the external lead-wire is not bent.

Further, the external lead-wire is able to be coupled to one pair of electrode by making both of the external lead-wires crone the axis of the discharge lamp light-transmissive ceramic enclosure. And also it is able to make only one of t external lead-wires cross the axis of the discharge lamp light-transmissive ceramic enclosure. The former configuration is effective for the case that the high-intensity discharge lamp is mounted to on the reflector by orthogonally crossing its axis of the discharge lamp light-transmissive ceramic enclosure with the optical axis of the reflector. Further the latter configuration is effective to the external lead-wire at the aide of the light-projecting opening of the reflector in the case of aligning the high-intensity discharge lamp on the reflector by making the axis of the light-transmissive ceramic discharge lamp in co-axial with the optical axis of the reflector.

Further, the angle for the external lead-wire crossing to the discharge lamp light-transmissive ceramic enclosure is generally 90°. If needed, however, it is allowable to be any desirable angle other than much angle.

By the way, when the feed-conductor is inserted into the discharge lamp light-transmissive ceramic enclosure to be sealed, a protrusion is formed on the outer protrusion or the cross-wire is welded. The protrusion or the cross-wire is engaged to the small diameter cylinder portion, then it is sealed, an as to ensure the positioning of the feed-conductor on the ceramic discharge enclosure.

Further, since the external lead-wire is able to be coupled to the outer protrusion after the discharge lamp light-transmissive ceramic enclosure is sealed, the coupling operability is enhanced. However the present invention is not limited to the manufacturing process as mentioned above. Accordingly, the eternal lead-wire is able to be coupled to the outer protrusion of the feed-conductor beforehand In such a case, the outer protrusion is able to be covered by the sealant at the same time of sealing the discharge lamp light-transmissive ceramic enclosure.

Then, it is able to obtain the high-intensity discharge lamp which is able to light in air by providing the external lead-wire constituted of the acid-resistive metal.

(6) The Ceramic Washer

When the external lead-wire comprised of the acid-resistive metal is coupled to the sealable metal, it is provided with an axial hole formed in the anal direction and a pass-through portion which reaches the outer surface through the axial hole. And also, by using the ceramics washer placed in the proximity of the edge of the small diameter cylinder portion of the light-transmissive ceramics discharge enclosure in the way that the base end of the sealable portion of the feed-conductor is placed in the axial hole, the external lead-wire is inserted in the through-hole of the ceramic washer and coupled to the sealable portion in the axial hole, so as to cross the axis of the discharge lamp light-transmissive ceramic enclosure.

For the ceramic washer, e.g., an alumna ceramic which is shaped in a washer shape and defined a through-hole at its center is able to be used. Then the center hole is fit around the outer protrusion so as to make a barrier for sheathing a running-out of a melted solution of the sealant.

In the case that the outer protrusion is covered by the second sealant by using the ceramic washer, there are several configurations for leading out the external lead-wire. One is the type of leading out the external lead-wire in the discharge lamp light-transmissive ceramic enclosure in the axial direction, and the other is the type of leading out it in the transverse direction.

In the case of the former type, it in led through the center hole of the ceramic washer.

In the case of the latter type, the ceramic washer is worked to be provided thereto a pass-through portion in a form of a radial slit, a radial groove or a simple through-hole. Then the external lead-wire is passed through the pass-through portion. i.e., the slit, the grove or the through-hole defined on the ceramic washer. Further, there may be a case that the external lead-wire is led out from a gap between a ceramic washer and the end surface of the small diameter cylinder portion of the discharge lamp light-transmissive ceramic enclosure, without working the ceramic washer.

Functions of the Invention

In the high-intensity discharge lamp according to the present invention, it is provided with a coil portion on the sealable portion of the feed-conductor, so as to make it easy to couple the refractory portion and resistant to be off-centered from the sealable portion at a coupling operation.

Further, if the coil portion extends to the mid-portion of the sealable portion, the sealing film is able to be formed inside the coil portion by the sealant being melted and then entering inside the coil portion so as to enhance the sealing reliability In the case that the outer protrusion is placed on the sealable portion, or the external lead-wire is coupled to the sealable portion, the coupling portion of the sealable portion may be formed as a coil portion. In such a configuration, it is easy to couple the outer protrusion and the external lead-wire to the sealable portion and becomes hard to be off-centered from each other.

Furthermore, if there are gaps between the turns of the coil in the mid-portion of the coil portion the thermal conduction from the discharge space will go bad, and the temperature of the sealable portion decreases. As a result, the sealing reliability enhances proportionally.

The high-intensity discharge lamp device according to the invention of claim 2, comprising;

a discharge lamp light-transmissive ceramic enclosure having an envelope defining a discharge space and a small diameter cylinder portion communicating with the envelope and having a diameter smaller than the envelope;

a feed-conductor having a sealable portion with at least its mid-portion formed in a coil portion and a refractory portion with its base end coupled to the coil portion by inserted thereinto, the feed-conductor then extending into the small diameter cylinder portion of the discharge lamp light-transmissive ceramic enclosure in leaving a narrow gap between the inner surface of the small diameter cylinder portion and the refractory portion;

an electrode mounted on the end of the refractory portion of the feed-conductor;

a sealant for sealing a gap between the small diameter cylinder portion of the discharge lamp light-transmissive ceramic enclosure and the sealable portion of the feed-conductor so that at least the sealable portion fails to be exposed to the discharge space; and an ionizing agent filled in the discharge lamp light-transmissive ceramic enclosure.

The present invention is characterized by that at least the mid-portion of the sealable portion of the feed-conductor is constituted by a coil portion. Accordingly, it is able to easily and surely form a sealing film as thick as possible by entering the sealant inside the sealable portion of the feed-conductor. When the sealing film is formed inside the sealable portion, it is able to enhance the sealing reliability.

This is because that in case of no sealing film inside the sealable portion, the sealing is broken by cracks caused on either the sealable portion in the end surface of the small diameter cylinder portion or the junction to the refractory portion.

In the present invention, since the sealing film is formed between the sealable portion and the coupling portion, even if the crack is caused on one or both of the sealable portion and the coupling portion the sealing is not broken. Accordingly, according to the present invention, it is able to enhance the sealing reliability.

Further, according to the present invention, since it is easy to form a thick sealing film by the sealant inflating inside the coil portion on the middle of the sealable portion, it is able to further enhance the sealing reliability. However, instead of such a configuration, it may adopt another configuration in which a sealable metal rod is inserted inside the coil portion on the mid-portion, so as to make the sealable portion hard to bend. Further, by fitting in a face-to-face manner the tip end of the rod to the base end of the refractory portion, it is also make the entire of the feed-conductor hard to bend.

Further according to the present invention, if needed, not only the mid-portion of the sealable portion but also the end portion in able to he formed to be the coil portion. In this case, it is able to make the extent across the mid-portion to the tip end as a continuous coil portion If needed, however, the coil portions of the tip end and the base end of the sealing portion may be communicated via a rod or a pipe. In either case, by forming the tip end into the coil portion, the refractory portion is able to be easily coupled to the sealable portion without being off-centered therefrom.

Furthermore, according to the present invention, such a coil portion may be formed on the base end side of the sealable portion, in addition to the one formed on the mid-portion of the sealable portion. In such a case, it is able to make the extent across the mid-portion to the tip end as a continuous coil portion, also able to link the mid-portion and the tip end by a different member no described above.

In either case, by forming the coil portion at the base end side, it is able to easily couple the outer protrusion or the external lead-wire to the coil portion without being off-centered from each other.

Furthermore, according to the present invention, the coil portion can be formed on either side of the tip end and the base end of the sealable portion in addition to the mid-portion, according to the configuration as mentioned above.

The high-intensity discharge lamp device according to the invention of claim 8, further comprising:

a high-intensity discharge lamp as claimed in claim 1 or 2; and a reflector for condensing the light radiated the high-intensity discharge lamp.

The axis of the high-intensity discharge lamp is able to be co-axial with the optical axis of the reflector, or may be orthogonal to the optical axis of the reflector.

Further, the reflector and the high-intensity discharge lamp may be integrated by directly firing them with a refractory adhesive, or they may be indirectly fixed via a third member. In the latter configuration, for example by fixing the reflector and the high-intensity discharge lamp in the lighting system, the reflector and the high-intensity discharge lamp are able to be fired to each other so as to have a desirable optical relation with each other.

Furthermore, the high-intensity discharge lamp may be the type of the outer bulb exposing in air, or the type of the outer bulb being accommodated in the outer bulb.

Accordingly, according to the present invention, since it is able to use the compact high-intensity discharge lamp having a rated power consumption about 20 W, it is able to obtain the high-intensity discharge lamp device which is totally compact and have an excellent light condensing capability.

The high-intensity discharge lamp device according to the invention of claim 4, is characterized by that it is provided with;

a high-intensity discharge lamp as claimed in claim 1 or 2; and a concave reflector to which the high-intensity discharge lamp is arranged so as that the axis of the lamp is nearly orthogonal to the optical axis of the reflector and the principal part of the ceramic sealing compound sealant fails to be exposed to the side of the interior of the reflector The reflector, if it is shaped in concave, may be a rotary second-order curved surface such as a rotary parabolic surface or a rotary oval surface, or their corrected curved surfaces.

Further, the reflector is able to be configured by forming a reflection surface on a base body made of such a glass or a metal or shaping a refractive metal, e.g., an aluminum, a silver, a chromium, etc., or an alloy including one of them as a principal element.

Further, the reflection surface may allow a configuration having the visible radiation reflect/infrared ray transmit capability made of a multi-layered interference film, or a evaporation coating of a reflecting metal Furthermore, to support the reflector, it is able to protrude the support base with a suitable configuration from the back of the top portion. The support base is able to be used for defining a position for installing the reflector or for fixing the reflector. For fixing the reflector, it is able to not only form the supporting base into a cylindrical shape, but also form a protrusion capable of inserting into the cylinder portion of the supporting base on a receiving side and then fix them using a refractory adhesive, By the way, according to the present invention, the feature that "the principal part of the sealant made of ceramic sealing compound substantially fails to be exposed inside" means that a portion effective for sealing fails to be exposed to the reflector surface. For instance, the surface of the sealant at side of the discharge space and their proximity fail to constitute the principal part, even though they extend to the refractory portion of the feed-conductor for enveloping the entire of the sealable portion. The portion presenting a hermetic section in the small diameter cylinder portion configures a part of the principal part.

However, according to the present invention, even though a marginal part of the principal part of the sealant exposes to the inner surface of the reflector, it is permissible if the exposing portion does not affect the sealing.

Generally, since the principal part of the sealant is placed on the mid-portion of the small diameter cylinder portion the mid-portion is able to be placed on a portion near to the edge of the reflector, or being exposed outside from the outer surface of the reflector. To this end, it is better to form through-holes on the reflector for passing there-through the small diameter cylinder portions. Further it is able to leave a space between the through-holes and the small diameter cylinder portions. Further, it may configure that the high-intensity discharge lamp is not fixed to the reflector but supported by the external lead-wire.

If needed, however, it may be configured that the space is filled with a heat-shielding inorganic adhesive, so as to fix the high-intensity discharge lamp and shut out the heat emission.

Further, in the high-intensity discharge lamp according to the present invention, it may be a configuration that the discharge lamp light-transmissive ceramic enclosure is accommodated in the outer bulb.

Further, according to the present invention, the high-intensity discharge lamp is mounted on the reflector having an optical axis orthogonal to the axis of the discharge lamp light-transmissive ceramic enclosure with the optical axis of the reflector, and the principal part of the ceramic sealing compound substantially fails to be exposed to the inner surface of the reflector. Thus the temperature of the sealant rises during the lighting operation of the high-intensity discharge lamp but prevented from an excessive rise. Accordingly the temperature rise of the sealant makes a leak hard to cause.

Here, if the principal part of the sealant is bare, the radiant light and the radiant heat of the high-intensity discharge lamp reflect at the inner surface of the reflector, and a part of them radiate the bare part of the sealant, the temperature at the bare part rises.

Further, in the high-intensity discharge lamp according to the present invention, the ionizing agent stays in a liquid-phase in the narrow gaps formed inside the small diameter cylinder portions at both ends of the discharge lamp light-transmissive ceramic enclosure, but the surface of the liquid-phase ionizing agent at the side of the discharge space becomes the coldest portion regardless of the lighting position of the high-intensity discharge lamp, then the vapor pressure of the ionizing agent is defined. Accordingly, since the coldest portion presents at a fixed position near the reflector surface of the reflector, the liquid phase ionizing agent does not disturb the light condensing operation of the reflector.

However, in the case of the high-intensity discharge lamp having the transparent discharge enclosure made of a silica glass, since such a lamp does generally not include such a narrow gap, the coldest portion presents on one part of the bulb wall of the discharge space. Accordingly, if the high-intensity discharge lamp made of the silica glass is placed its one side on the concave reflector so as that the top portion of the reflector condenses the light such as the present invention, it causes a problem that the quality of the light is lowered due to the light being shaded by the liquid-phase ionizing agent at the coldest portion stick to the bulb wall.

Furthermore, according to the present invention, since the reflector is able to desirable condense the light even if the reflector is shallow, it is possible to make the high-intensity discharge lamp device compact.

Furthermore, since the top portion and its vicinity of the reflector works effectively to condense the light, the distribution of the light could be sharp, and not be disturbed.

The high-intensity discharge lamp device according to the invention of claim 6 is characterized by that further to the high-intensity discharge lamp device as claimed in claim 4 the surface of the liquid phase ionizing agent developed during the operation of the high-intensity discharge lamp in the narrow gap between the small diameter cylinder portion of the discharge lamp light-transmissive ceramic enclosure and the feed-conductor places at a side of the interior of the reflector.

In the high-intensity discharge lamp provided with the discharge lamp light-transmissive ceramic enclosure, it is possible to confine the temperature of the sealant in a proper tolerance by elongating the small diameter cylinder portion. Further, the coldest portion presents on the surface of the liquid-phase ionizing agent residing in the narrow gap in the small diameter cylinder portion at the side of the discharge space. If the temperature is excessively low, it is unable to obtain a desired lamp efficiency. Accordingly, the temperature of the coldest portion is better as high as possible to obtain the high lamp efficiency.

In the present invention, since the portion of the liquid phase ionizing agent where the coldest portion is presenting looks, as its surface facing the discharge space, toward the inner surface of the reflector, the surface of the liquid-phase ionizing agent is heated by the reflections of the radiant heat and the visible radiation from the high-intensity discharge lamp in the reflector. Accordingly, it is possible to obtain a desirable high lamp efficiency by the temperature of the coldest portion being raised.

Further, since the coldest portion presents at a position near the reflector surface of the reflector, it does not deteriorate the quality of the light distribution remarkable.

The high-intensity discharge lamp device according to the invention of claim 6, is characterized that further to the high-intensity discharge lamp device as claimed in claim 4 or 5, the reflector is provided with a pair of through-holes at positions symmetrical in regard to a line vertically crossing the optical axis of the reflector at a focus point of the reflector, and a pair of small diameter cylinder portions of the discharge lamp light-transmissive ceramic enclosure is inserted into the through-holes.

This invention provides a suitable configuration for mounting the high-intensity discharge lamp on the reflector.

That is, since a pair of through-holes are formed in the reflector and the small diameter cylinder portions of the high-intensity discharge lamp are inserted into the pair of through-holes from inside the reflector, it is easy to place the principal part of the ceramic compound sealant for sealing the gap between the inner surface of the small diameter cylinder portion of the discharge lamp light-transmissive ceramic enclosure and the feed-conductor not to be exposed in the interior of the reflector.

The through-hole of the reflector and the small diameter cylinder portion may be fixed by filling the heat-shielding inorganic adhesive between the gap of them. If needed, further, the gap may be left in vacant.

In the former case, it prevents the small diameter cylinder portion to be heated by the radiant heat passing through the gap by using the inorganic adhesive.

Further in the latter case, a cooling undergoes by permitting entering of air into the gap. Further, the reflector and the high-intensity discharge lamp may be supported separately.

Then, for mounting the high-intensity discharge lamp on the reflector by inserting the pair of the small diameter cylinder portions into the through-holes of the reflector, first one of the small diameter cylinder portions is inserted to through-hole till the back of the predetermined position. At this time since it becomes possible to insert the other of the small diameter cylinder portions into the other through-hole of the reflector, the other Oman diameter cylinder portion may be faced to the other through-hole and then inserted thereto. In this case, it is regardless to say that the diameter of the through-holes are defined in as large as permissible the assembling operation as described above.

According to this invention, since the reflection surface of the reflector excluding the through-holes is able to be minimized, it as possible to obtain the high-intensity discharge lamp device provided with the reflector having a high reflection efficiency.

In the high-intensity discharge lamp provided with the discharge lamp light-transmissive ceramic enclosure, a pair of the small diameter cylinder portions which extend from the centrally located envelope to both sides becomes longer to a certain extent for the sealing principal under any conditions. However, by the configuration as mentioned above, the non-reflection portion is able to be minimized.

The high-intensity discharge lamp lighting circuit according to the invention of claim 7, comprising:

a high-intensity discharge lamp as claimed in claim 1 or 2 in which the ionizing agent contains a neon and an argon as a buffer gases; and a stabilizer for lighting the high-intensity discharge lamp at a high frequency region.

This invention is constructed with the high-intensity discharge lamp and the stabilizer for lighting the lamp. However, by combining them it is possible to obtain a less-expensive and a compact high-intensity discharge lamp lighting circuit.

First, to light the high-intensity discharge lamp in general it is necessary to use a stabilizer wherein an igniter for generating a relatively high pulse voltage at the starting time is integrated. The stabilizer of the high-intensity discharge lamp is overwhelmingly large in comparison with that of the fluorescent lamp with the same rated lamp power. Accordingly, even if a compact high-intensity discharge lamp is provided for all troubles, an overall system containing a light source, a stabilizer and a lighting apparatus results to have a large size.

To solve the above problem, the inventor has studied to use a stabilizer principally constituted by a compact high-frequency inverter which is used for the fluorescent lamp, especially for the electric bulb fluorescent lamp. The stabilizer for the electric bulb shaped fluorescent lamp is generally simple in its circuit arrangement, and works at a high frequency. Accordingly, such a stabilizer is compact, light in weight and less-expensive.

However, when a high-intensity discharge lamp is lighted using such a compact stabilizer for the fluorescent lamp, a strong blackening occurs at the starting operation.

As a result that the inventor has made investigations in detail about the cause and the measure of the blackening, following conclusions have been obtained.

(1) Materials of the blackening are constituted by principally a tungsten constituting electrodes.

(2) The blackening is caused by that the tungsten of the electrodes evaporates at the starting operation, especially by the glow-arc transition. Then the tungsten adheres on the inner surface of the discharge lamp light-transmissive ceramic enclosure.

Further to the conclusions, it is clarified that as a result of another investigation about the behavior of the electrode at the glow-arc transition in comparison with the stabilizer of the conventional high-intensity discharge lamp which does not cause such a blackening at the starting operation, the blackening is caused by the difference of load characteristics between the fluorescent lamp stabilizer and the high-intensity discharge lamp stabilizer.

FIG. 20 is a graph showing the load characteristics of the high-discharge lamp stabilizer and the fluorescent lamp stabilizer.

In FIG. 20, the horizontal axis shows a current and the vertical axis shows a voltage.

In FIG. 20, also the curve A shows the load characteristics of the high-discharge lamp stabilizer, and the curve B shows the one of the fluorescent lamp stabilizer. Here, as the rated operation points of the high-discharge lamp of both stabilizers occur in the range that the voltage is 72 to 75 V and the current is 280 to 340 mA of the load characteristics, the rated operation points of the two types of the stabilizers are almost same.

However, the load characteristics of the high-discharge lamp stabilizer, as shown in the characteristic curve A, the second-order open-circuit voltage V20 is relatively low but the second-order short-circuit current IS is relatively high. This is because that a higher pulse voltage is generated by an igniter at the starting operation, then superposed to the output voltage of the stabilizer and lastly the superposed voltage is applied to lamp. So that the stabilizer is not required to generate a too-high voltage at the starting time. Further since the lamp voltage is low at the starting time in the high-intensity discharge lamp the lamp current be enlarged.

On the other hand, as shown in the curve B, in the load characteristics of the fluorescent lamp stabilizer presents, the second. order open-circuit voltage V20 is relatively high but the second-order short circuit current IS is relatively slow. Then, the curve B smoothly extends between these two points. Accordingly, in the lower current region corresponding to the glow-arc transition time, e.g., in the region lower than the 30 mA, the second-order open-circuit voltage is higher than that of the high-intensity discharge lamp stabilizer Further, as the result of determining a glow power at the glow-arc transition, the slow power in the case of using the fluorescent lamp stabilizer was several times higher than that in the case of using the high-intensity discharge lamp stabilizer From the consideration of the above results, it is thought that the blackening is caused the evaporation of the tungsten constituting electrodes under an excessive glow power.

First, the high-intensity discharge lamp used in the present invention will be explained.

In the present invention, in addition to the configuration of the high-intensity discharge lamp, it in so configured that the ionizing agent contains a neon and an argon as the buffer gas, and the ionizing agent is inserted in the discharge lamp light-transmissive ceramic enclosure go as to present 1 atmospheric pressure or more during the operation of the lamp.

Among the neon and the argon, the argon is mixed with the neon at the ratio of 0.1–10% in the percent pressure.

Further, the neon and the argon are generally used at an ambient pressure of 50 to 580 torr. Here, if the ambient pressure is less than 50 torr, the glow-arc transition time becomes longer, and the blackening due to the evaporation of the tungsten constituting electrode becomes significant. On the other hand, if the ambient pressure exceeds 580 torr, the operating voltage of the high-intensity discharge lamp rises, and the glow power increases, and thus the object of the present invention cannot be achieved.

The glow-arc transition time and the extent of the blackening vary in accordance with the ambient pressure of the buffer gas. The more the ambient pressure increase, the more the glow power increases, and the more the heating temperature of the electrode risen. As a result, the glow-arc transition time tends to be shortened.

On the other hand, if the ambient pressure of the neon and the argon become excessive the blackening increases. While if the ambient pressure becomes too little the evaporation of the electrode substance increases due to the increasing of the glow-arc transition time.

Accordingly, by limiting the ambient pressure of the neon and the argon in the range of 100 to 200 torr, the glow-arc transition time will be 2 to 3 seconds, and also the blackening is remarkably reduced. The glow-arc transition time in such extent resides in a tolerance in practical application.

Further, in addition to the neon and the argon, other rare gases are able to be inserted as occasion needed.

Now, the stabilizer used in the present invention will be explained.

In the present invention, the load characteristics of the applicable stabilizer is the same as that represented in the case of the fluorescent lamp stabilizer. Further, the present invention is backed by a new knowledge that even though the high-intensity discharge lamp combined with then above-described constructions by the stabilizer having such load characteristics is operated, the blackening does not occur at that situation.

Accordingly, the stabilizer for the fluorescent lamp is able to be diverted for the present invention. Off course it is regardless to say that it is able to use the stabilizer which is manufactured for the high-intensity discharge lamp to satisfy a predetermined load characteristics.

In the present invention, "high frequency" means the frequency of 10 kHz or higher, Furthermore, in present invention, the second-order open-circuit voltage V20 of the stabilizer is set up within the range having relatively large flexibility for the discharge starting voltage of the high-intensity discharge lamp. That is, the ratio V20/VS of the second-order opening discharge voltage V20 of the stabilizer to the discharge starting voltage VS of the high-intensity discharge lamp is able to be set up in the following range, $$160 \leq V20/VS \leq 300$$

Here, since the discharge starting voltage Vs of the high-intensity discharge lamp statistically varies, it have to pay much attention to specify the discharge starting voltage Vs.

At the occasion of the performing the present invention, it is able to configure that the second-order open voltage of the stabilizer is close to the discharge starting voltage of the high-intensity discharge lamp, and the glow power at the starting operation time is able to be lowered.

The "second-order open-circuit voltage is close to the discharge starting voltage" means that the second-order voltage V20 is higher by 170 to 200% than the discharge starting voltage of the high-intensity discharge lamp.

In the case that the lamp power of the high-intensity discharge lamp is less than 30 W, the stabilizer is preferable to have a load characteristics in that the second-order opening discharge voltage V20 is less than 2.5 kVp-p, more preferably less than 2 kVp-p, and the second order short-circuit current IS is less than 1.0 A According to the configuration as mentioned above, it becomes far more easy to start the operation of the high-intensity discharge lamp.

By the way, the principal circuit arrangement of the stabilizer may be any type if it has the load characteristics as mentioned above. For instance, the stabilizer may have a circuit arrangement constituted by principally a half bridge inverter, a full-bridge inverter, a parallel inverter, a single-transistor type inverter such as a blocking oscillator inverter.

Now, the operation of the present invention will be explained.

As a premise for effecting the glow-arc transition, the glow-arc discharge is needed to change from a usual glow discharge to an unusual glow discharge. A requirement for the glow-arc transition is not only a correlation between the cathode voltage drop VK and the current density measured on electrode $j/p^2$ (here, j denotes a glow discharge current (mA), and p denotes an electrode surface area ($mm^2$)), but also varies in accordance with the buffer gas.

In the high-intensity discharge lamp lighting circuit of the present invention, since the ionizing agent contains a neon and an argon as a buffer gas, the electrode passes through the small diameter cylinder portion of the discharge lamp light-transmissive ceramic enclosure, and also the stabilizer has a load characteristics the same as that of the fluorescent lamp stabilizer, i.e. a load characteristics smoothly extending from the secondary open-circuit voltage to the second-order short-circuit current the same as the fluorescent lamp stabilizer, it is possible to lower the glow power at the glow-arc transition.

(1) A current density measured on electrode shrinks.

First, in case that the buffer gas is comprised of both the neon and the argon, even though cathode voltage drops are the same, the glow current at the transition from the usual glow discharge to the unusual glow discharge shrinks. So that the glow power also shrinks.

Further, at the glow discharge operation, since the mid-portion of the electrode which is passing through the narrow gap of the small diameter cylinder portion works as an electrode, like the edge portion of the electrode protruding to the envelope of the discharge lamp light-transmissive ceramic enclosure, the effective surface of the electrode increases. Accordingly, even though the cathode voltage drop is fixed, the current density measured on electrode is lowered.

(2) The discharge starting voltage is lowered

In the case that the buffer gas is comprised of both the neon and the argon, since the discharge starting voltage is lowered as is already known in comparison to the case that only the argon is used as the buffer gas, it is able to lower the voltage which is supplied from the stabilizer at the glow-arc transition, and thus the glow current is lowered. Here, it is possible to lower the discharge starting voltage lower than 2 kVp-p, (3) The positive column loss increases.

If the buffer gas is comprised of both the neon and the argon, the positive column loss increases in comparison to the case that only the argon is used an the buffer gas, and thus a voltage to be supplied to electrodes is.

As a result, the glow power is reduced to about 1/5 in comparison to the argon unit. It is found that the glow-arc transition time is extended, the evaporation of the tungsten of the electrode is depressed, and thus tho blackening in remarkably reduced. Here the glow-arc transition time is able to be confined in a proper tolerance in practical application by optimizing the ambient pressure of the buffer gas.

As seen from the above description, in this invention, it is possible to obtain a compact high-intensity discharge lamp lighting circuit by using the compact stabilizer without using any igniter The high-intensity discharge lamp lighting circuit of the invention of claim 8 is characterized in that further to the high-intensity discharge lamp lighting circuit claimed in claim 7 t stabilizer is constituted by principally a high frequency inverter provided with an LC oscillator.

As an inverter satisfying the requirements as mentioned above, it is able to be used a half bridge inverter, a single-transistor type inverter, e.g., a blacking oscillator inverter, or a parallel inverter.

The oscillation control of the inverter may be done by either of a self-excitation or a separate-excitation. Further, the oscillating frequency of the inverter may be made by either fixed or variable.

When the oscillating frequency of the inverter to the resonance frequency of the LC resonance circuit varies in accordance with a situation, the output voltage of the stabilizer is able to be controlled by changing the oscillating frequency of the inverter. That is, if the oscillating frequency is brought closer to the resonance frequency of the LC resonance circuit at the starting operation, the output voltage rises, and thus the second-order open-circuit voltage is able to be brought closer to the discharge starting voltage of the high-intensity discharge lamp. On the other hand, if the oscillating frequency is brought apart from the resonance frequency after lighting, the output voltage is reduced.

Accordingly, it is possible to provide the stabilizer with a load characteristics which smoothly extends from the second-order discharge voltage close to the discharge starting voltage of the high-intensity discharge lamp to the second-order short-circuit current.

On the other hand, when the oscillating frequency is fixed, it is able to control the output voltage of the stabilizer, by constituting the LC resonance circuit so as that its resonance frequency varies in response to a situation. That is, when it is so arranged that the inductor L of the LC resonance circuit saturates at a nonloaded state, the inductance of the inductor L shrinks under saturation, while the resonance frequency rises, so that the resonance frequency will approach the oscillating frequency. As a result, the output voltage of the stabilizer rises. Further, at a loaded state, the saturation of the inductor L of the LC resonance circuit is released according to the lamp current, and the inductance rises, so that the resonance frequency is estranged and the output voltage is reduced.

In this invention, the circuit arrangement is simplified, and thus it is possible to obtain the compact and inexpensive high-intensity discharge lamp lighting.

Further, since the stabilizer in provided with the LC resonance circuit, the waveform of the output voltage is able to be shaped to a sinusoidal waveform.

The lighting device of the invention of claim 9, comprising:
 a lighting system principal body; and
 a high-intensity discharge lamp as claimed in claim 1 or 2 which is mounted on the lighting apparatus principal body.

In this invention, the "lighting system" has wide varieties including any devices using a light of the high-intensity discharge lamp in one object or another. For instance, the lighting system is able to be applied to a light bulb type high-intensity discharge lamp, a lighting equipment, a mobile head light, a light source for optical fibers, an image projection device, an opto-chemical device, or a fingerprint discrimination device.

The "lighting device principal body" designates a whole portion of the lighting system except the high-intensity discharge lamp.

The "light bulb type high-intensity discharge lamp" means the lighting system in which the high-intensity discharge lamp and the stabilizer are integrated together, and provided with a bulb-base for receiving a power when connected to a lamp socket, so as to allow to be used in similar manner to the ordinary incandescent lamp.

Further, in came of constituting the light bulb type high-intensity discharge lamp, it is able to provide a reflector for condensing light so as that the high-intensity discharge lamp presents a desired light distribution characteristics.

Furthermore, for moderately reducing the brightness of the high-intensity discharge lamp, it is able to provide a light diffusion glove, or a cover in place of or it addition to the reflector.

Further, it is able to use a bulb-base having a desirable requirement. Accordingly, for replacing directly with conventional light lamps, a bulb-base the same as that of the conventional light lamps is able to be adopted.

Further, by accommodating the discharge lamp lighting circuit in a proper case, it is able to enhance not only an appearance, but also handling and safety.

Furthermore, in the light bulb type high-intensity discharge lamp, though it is worried about the temperature rise due to heats from the high-intensity discharge lamp during its operation. However, it is able to reduce the heats radiated to the discharge lamp lighting device by equipping a heat reflective reflector.

By the way, as the discharge lamp lighting device for lighting the high-intensity discharge lamp, it is preferred to comprise a high frequency lighting circuit having an inverter and a current limiter for reducing in size and weight. In this case, the current limiter is able to use an inductor, a resistor or a capacitor.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein FIG. 1 is a partial front section of a first embodiment of the high-intensity discharge lamp according to the present invention;

FIG. 2 is a partial vertical section of the high-intensity discharge lamp in its upper portion being sealed;

FIGS. 6a to 6e are drawings for showing the sealing process using the first and the second sealants in the first embodiment of the high-intensity discharge lamp according to the present invention;

DESCRIPTION OF THE PREFERRED EMBODIMENTS

Referring now to attached drawings, FIGS. 1 to 29, some embodiments of the present invention will be explained hereinafter.

FIG. 1 is a partial front section of a first embodiment of the high-intensity discharge lamp according to the present invention.

FIG. 2 is a partial vertical section of the high-intensity discharge lamp in its upper portion being sealed.

Figure 3:
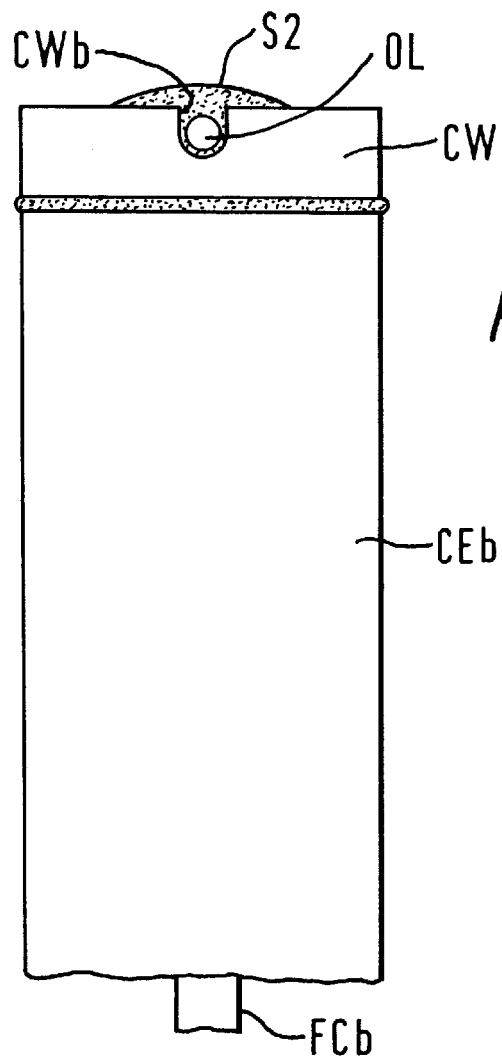
FIG. 3 is a partial enlarged side view showing the upper portion of the high-intensity discharge lamp.

FIG. 3 is a partial enlarged side view showing the upper portion of the high-intensity discharge lamp.

Figure 4:
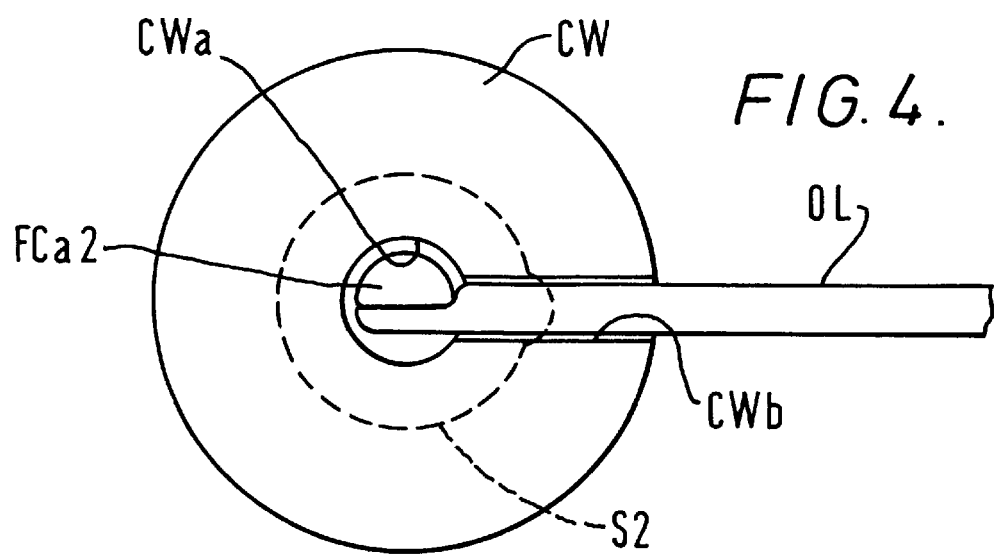
FIG. 4 is a partial enlarged plan view of the high-intensity discharge lamp in its upper portion being unsealed.

FIG. 4 is a partial enlarged plan view of the high-intensity discharge lamp in its upper portion being unsealed.

Figure 5:
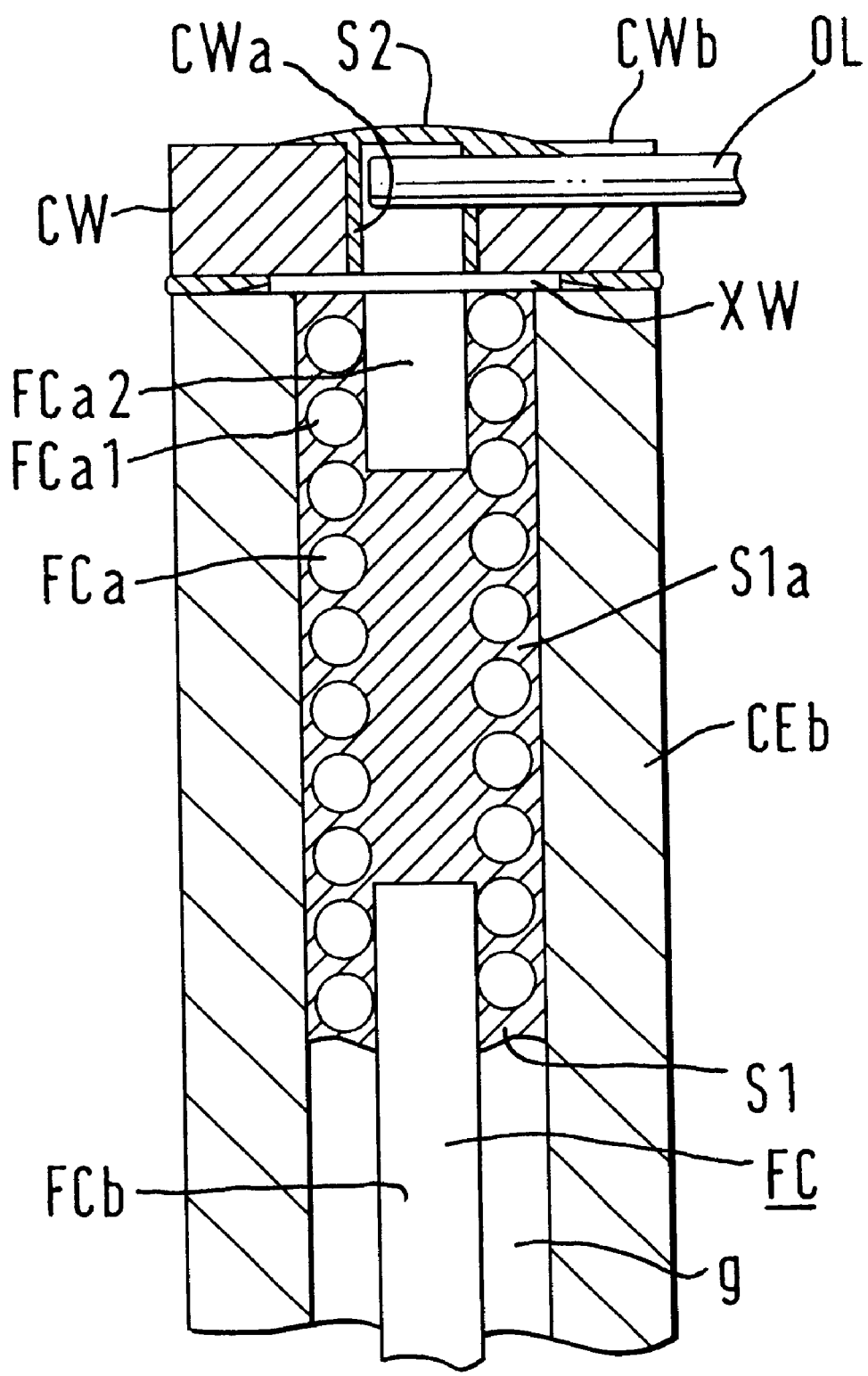
FIG. 5 is a vertical section of the upper portion of the same high-intensity discharge lamp.

FIG. 5 is a vertical section of the upper portion of the same high-intensity discharge lamp.

In the drawings, CE denotes a discharge lamp light-transmissive ceramic enclosure, FC denotes a feed-conductor, XL denotes a cross-wire, OL denotes a external lead-wire, E denotes an electrode, S1 denotes a first sealant, CW denotes a ceramic washer, and S2 denotes a second sealant.

The discharge lamp light-transmissive ceramic enclosure CE made of YAG, is provided with an envelope CEa and a small diameter cylinder portion CEb, CEb. The envelope CEa has a maximum outer diameter of about 5.5 mm. The small diameter cylinder portion SEb has an outer diameter of 1.7 mm, a length of 25 mm and an interior volume of about 0.03 cc.

The envelope CEa is hollow and almost oval whose both end are shrunk by smooth curved surfaces.

The small diameter cylinder portion CEb is coupled to the envelope CEa by a smooth curved surface, so as to integrally form the discharge lamp light-transmissive ceramic enclosure CE.

The feed-conductor PC in comprised of a sealable portion FCa and a refractory portion FCb.

The sealable portion FCa is comprised of a coil portion FCa1 and an outer protrusion FCa2.

The coil portion FCa1 is shaped by winding a 0.15 mm thick niobium wire by 10 turns to have a diameter of 0.6 mm, an inner diameter of 0.80 mm and a length 1.7 mm.

The outer protrusion FCa2 is made of a niobium rod of 0.2 mm diameter and 0.7 mm length. About half length of the outer protrusion FCa2 in its tip end side is inserted in the coil portion FCa1 from its base end and then coupled to the coil portion FCa1 by welding.

The refractory portion FCb is made of a 0.2 mm thick tungsten rod. Its base end is inserted into the upper portion of the end coil portion FCa1 and then coupled to the sealable portion FCa by welding.

Then, the feed-conductor FC is inserted into the small diameter cylinder portion CEb in the state that the base end of the outer protrusion roar of protrudes outside the discharge lamp light-transmissive ceramic enclosure CE. The feed-conductor FC is then supported to the discharge lamp light-transmissive ceramic enclosure CB by the first sealant S1. As a result, a narrow gap g is formed between the inner surface of the small diameter cylinder portion CEb of the discharge lamp light-transmissive ceramic enclosure CE and the outer surface of the refractory portion FCb.

As shown in FIG. 5, a cross-wire XW is comprised of a niobium thin wire. The cross-wire XW is then welded to the outer wall of the outer protrusion portion FCa2 of the sealable portion FCa so as that the cross-wire XW works for positioning the feed-conductor FC to the email diameter cylinder portion CE. Here, the cross-wire XW is omitted in FIG. 2.

The external lead-wire OL is made of a Fe—Ni—Co ally. Its end is welded to the base end of the outer protrusion FC2 of the sealable portion FCa in an angle of 90°.

The electrode E is shaped in a cylinder by rounding an about 50 $\mu$m thick tungsten plate in leaving a junction line j1 with a narrow gap of about 2 $\mu$m so as to have an inner diameter of 0.29 mm and a length of 1.2 mm. The electrode E is then coupled the tip end of the refractory portion FCb of the feed-conductor FC by fitting thereto.

The first sealant S1 is made of a ceramic sealing compound of Al2O3—SiO2—Dy2O3 type, i.e., a frit glass, whose melting point is 1550° C.

The first sealant S1 seals the discharge lamp light-transmissive ceramic enclosure CE by entering in the narrow gap formed between the small diameter cylinder portion CEb of the transparent CE and the base ends of the sealable portion FCa and the base, end of FCb, and also supports the feed-conductor FC in a predetermined position. Then, the first sealant S1 will make a thick sealing film S1a in the interior of mid-portion of the coil portion FCa1.

The ceramic washer CW is made of an alumina ceramics, and having an outer diameter the same as that of the small diameter cylinder portion CEb and an axial hole CWa in its center. Furthermore, the ceramic washer CW is formed on its top a groove CWb which communicates the axial hole CWa to outside. The ceramic washer CW is placed on the tip end of the small diameter portion CEb. In the axial hole CWa the base end of the outer protrusion FC2a of the sealable portion FCa and the tip end of the external lead-wire OL coupled to the sealable portion FCa are stored. The external lead-wire OL is also stored in the groove CWb on the ceramic washer CW, and the extends in the right angle in reference to the axis of the transparent ceramic discharge lamp enclosure CE.

Since the external lead-wire OL is stored in the groove CWb on the ceramic washer CW, the joint to the outer protrusion FCa2 is almost not damaged by a bending stress.

The second sealant S2 is made of an adhesive glass of CaO—BaO—SiO2 type, i.e., a frit glass, whose melting point is 1045° C.

Further, the second sealant S2 covers the base end of the sealable portion FOb and the tip end of the external lead-wire OL stored in the axial hole CWa of the ceramic washer CW, so as to seal them not to be exposed outside.

Referring now to FIGS. 6a to 6e, the sealing process using the first and the second sealants will be explained hereinafter.

FIGS. 6a to 6e show the sealing process using the first and the second sealants in the first embodiment of the high-intensity discharge lamp according to the present invention.

(1) Sealing Process by the First Sealant S1

As shown in FIG. 6a, first, the discharge lamp light-transmissive ceramic enclosure CE takes a standing attitude in the state of the small diameter cylinder portion CEb residing top. Then an assembly of the electrode E and the feed-conductor FC is inserted into the small diameter cylinder portion CEb from above till the cross-wire XW reaches the end of the small diameter cylinder portion CCb, and supported therein.

Then, as shown in FIG. 6b, a ceramic sealing compound CC1 formed in a ring-shaped pellet is placed around the sealable portion of the discharge lamp light-transmissive ceramic enclosure CE, and the outer protrusion FCa2 of the sealable portion FCb which protrudes outside from the edge surface of the small diameter cylinder portion so that it is melted by heat.

According to the meting by heat, as shown in FIG. 6c, the melted solution of the ceramic sealing compound CC1 flows into the gap between the sealable portion FCa and the inner surface of the small diameter cylinder portion CEb, and the solution fills the interior of the coil portion FCa1 in covering the entire of the sealable portion FCa which is inserted in the small diameter cylinder portion CE1b. Then the solution undergoes cooling at the position around the base end of the refractory portion FCb, so as to form the first sealant S1. The heating is performed by using a high frequency heating, a lazer heating or an infrared heating.

(2) Sealing Process by the Second Sealant S2

Further, as shown in FIG. 6d, the ceramic washer CW im fit around the outer protrusion FCa2 of the sealable portion FCa of the feed-conductor FC, and then the external lead-wire OL is accommodated in the groove CWb in the direction orthogonal to the axis of the discharge lamp light-transmissive ceramic enclosure CE. Then the external lead-wire OL is welded to the outer protrusion FCa2. A ceramic sealing compound CC2 formed in a pellet shape is placed on the ceramic washer CW and then heated.

According to the heating as mentioned above, the ceramic sealing compound CC2 is melted, as shown in FIG. 6a, and then its melted solution flows into the axial hole CWa of the ceramic washer CW, so as to cover around the outer protrusion FCa2 of the sealable portion FCa. The solution also flows to fill the gap between the back of the ceramic washer CW and the end surface of the small diameter cylinder portion CEb, where the solution undergoes cooling, so as to make the second sealant S2. Accordingly, even though one part of the cross-wire XW exposes outside the sealant S1, it is covered by the second sealant S2.

After the feed-conductor FC has been sealed to one of the small diameter cylinder portions CEb, the discharge lamp light-transmissive ceramic enclosure CE is placed in stand position so as that the other small diameter cylinder portion CEb reside in upper position. A proper quantity of an NaI, an InI, a TlI, a DyI8 and a mercury as the ionizing agent are filled into the ceramic discharge enclosure. Then, the peripheral is made to have an argon gas atmosphere of about 13300 Pa the same as the ambient pressure, so as to make the first sealant S1 by using the ceramic sealing compound CC1, then the argon gas is filled in the discharge lamp light-transmissive ceramic enclosure CB. After that, the ceramic washer CE is loaded and the external lead-wire OL is coupled thereto, so as to make the second sealant S2 by using the ceramic sealing compound CC2.

The resulted high-intensity discharge lamp obtained is a metal halide discharge lamp with 20 W rated power consumption.

Figure 7:
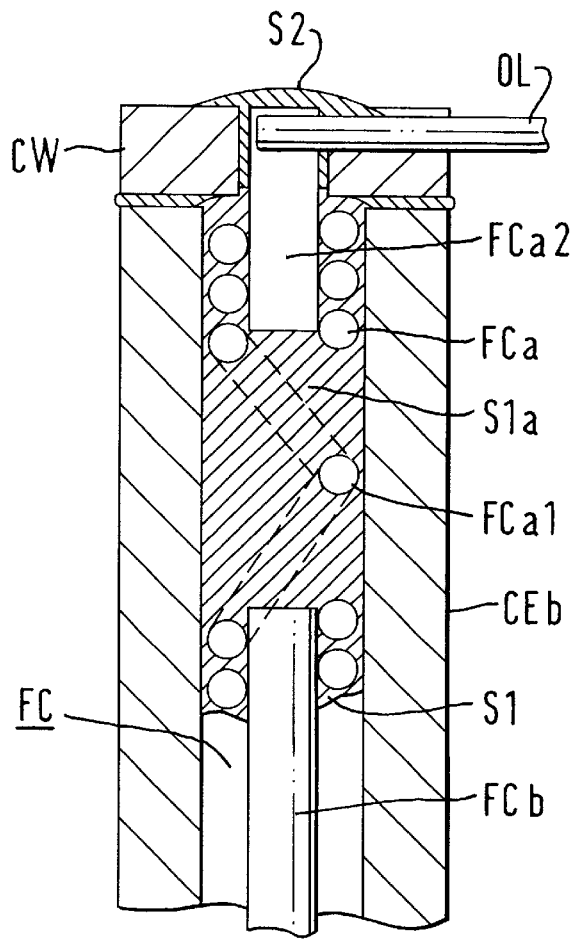
FIG. 7 is a partial enlarged vertical section of the upper portion of a second embodiment of the high-intensity discharge lamp according to the present invention.

FIG. 7 is a partial enlarged vertical section of the upper portion of a second embodiment of the high-intensity discharge lamp according to the present invention.

In FIG. 7, the same elements as those shown in FIG. 5 are assigned with same marks.

This embodiment differs from other embodiments in that the coil pitch of the mid-portion of the coil portion FCa1 of the feed-conductor FC is enlarged.

That is, the mid-portion of the coil portion FCa1 is formed to have 1 turn of a large pitch coil. It is possible to change the coil pitch of the mid-portion of the coil portion FCa1 as long as hindering its principal function of not only feeding electricity to the electrode E through the refractory portion FCb but also forming a thick sealing film S1a by filling the first sealant S1 inside the coil portion FCa1.

According to this embodiment, it is possible to reduce the cost of materials by shorting the Niobium wire.

Figure 8:
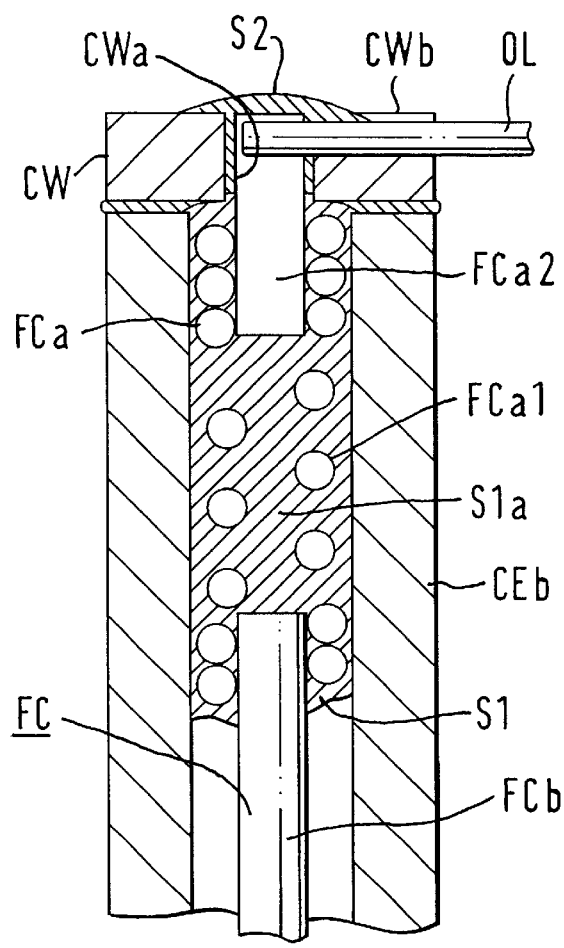
FIG. 8 is a partial enlarged vertical section of the upper portion of a third embodiment of the high-intensity discharge lamp according to the present invention.

FIG. 8 is a partial enlarged vertical section of the upper portion of a third embodiment of the high-intensity discharge lamp according to the present invention.

In FIG. 8, the same elements an those shown in FIG. 5 are assigned with same marks.

In this embodiment, the configuration of the coil portion FCa1 differs from those of the other embodiments.

That is, at first the coil portion FCa1 is wound tightly. After the base end of the refractory portion FCb is inserted in the tip end of the coil portion FCa1 and the tip end of the outer protrusion FCa2 is inserted into the base end of the coil portion FCa1, the mid-portion of the coil portion FCa1 is extended, so as to obtain the feed-conductor having an enlarged pitch. The subsequent manufacturing processes are the same as the other embodiment.

In this embodiment, since the refractory portion FCb and the outer protrusion FCa2 are inserted into the rightly wind coil portion FCa1 and then coupled thereto, it is possible to obtain a sufficient mechanical strength.

Figures 9, 10:
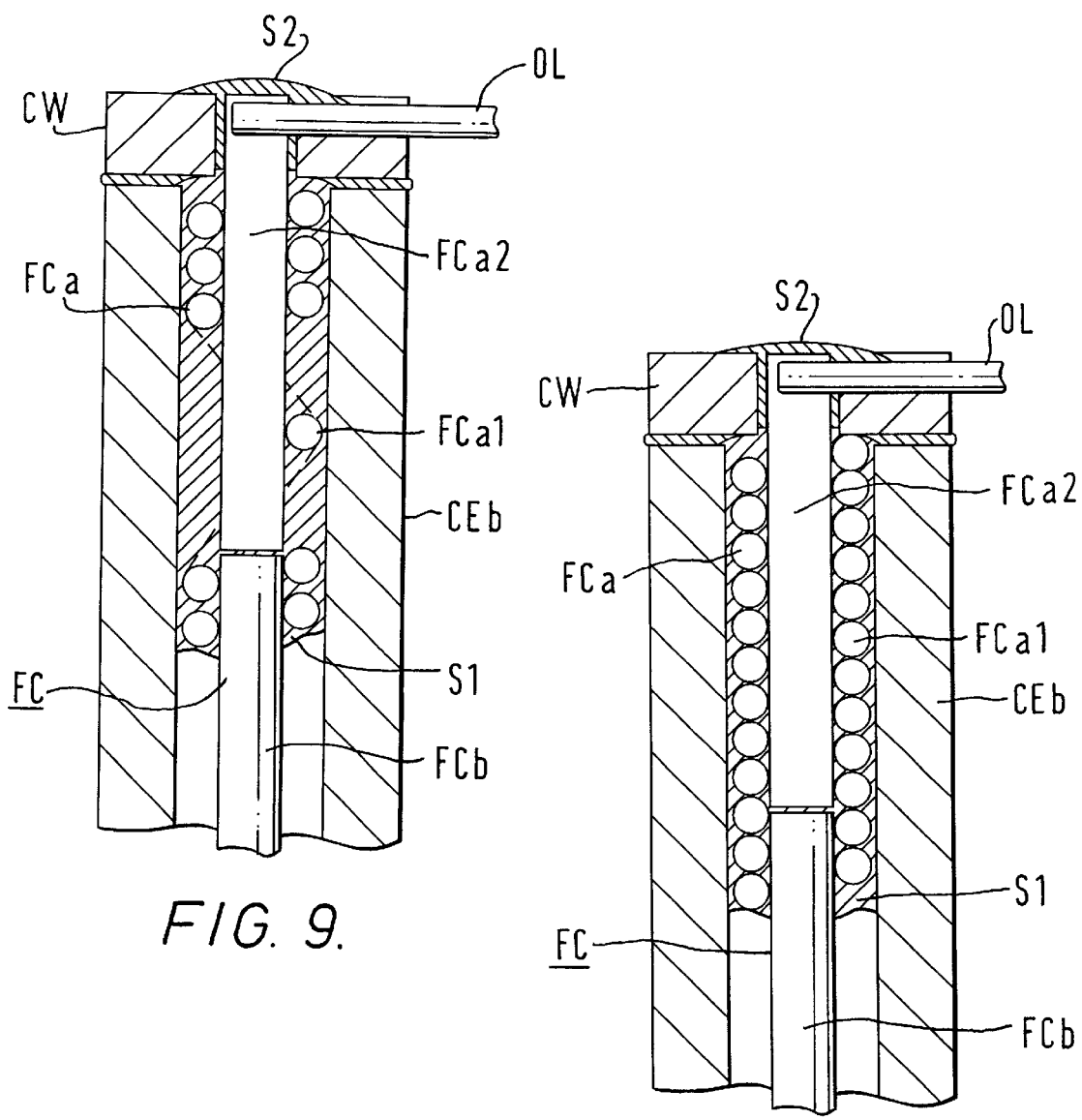
FIG. 9 is a partial enlarged vertical section of the upper portion of a fourth embodiment of the high-intensity discharge lamp according to the present invention.
FIG. 10 is a partial enlarged vertical section of the upper portion of a fifth embodiment of the high-intensity discharge lamp according to the present invention.

FIG. 9 is a partial enlarged vertical section of the upper portion in a fourth embodiment of the high-intensity discharge lamp according to the present invention.

In FIG. 9, the same elements as those shown in FIG. 7 are assigned with same marks.

This embodiment differs from other embodiments in that the tip end of the outer protrusion FCa2 further extends and fits in a face-to-face manner to the base and of the refractory portion FCb.

That is, by extending the outer protrusion FCa2 of the sealable portion FCa and fitting it in a face-to-face manner to the base end of the refractory portion FCb, the refractory portion FCb is defined its location to the tip end surface of the outer protrusion FCa2, so that the entire of the feed-conductor FC shows a good linearity Here, the outer protrusion FCa2 and the refractory portion FCb do not need to electrically conduct to each other, while it may have a narrow gap between them.

FIG. 10 is a partial enlarged vertical section of the upper portion of a fifth embodiment of the high-intensity discharge lamp according to the present invention.

In FIG. 10, the same elements as those shown in FIG. 9 are assigned with same marks.

This embodiment differs from other embodiments in that the coil portion FCa1 of the sealable portion of the feed-conductor is tight-wound.

That is, if the coil portion FCa1 is tight-wound, the entire of the feed-conductor FC shown a good linearity.

Here, though it takes somewhat a long time for the first sealant S1 entering into the coil portion FCa1. However it is not a principal problem.

Figure 11:
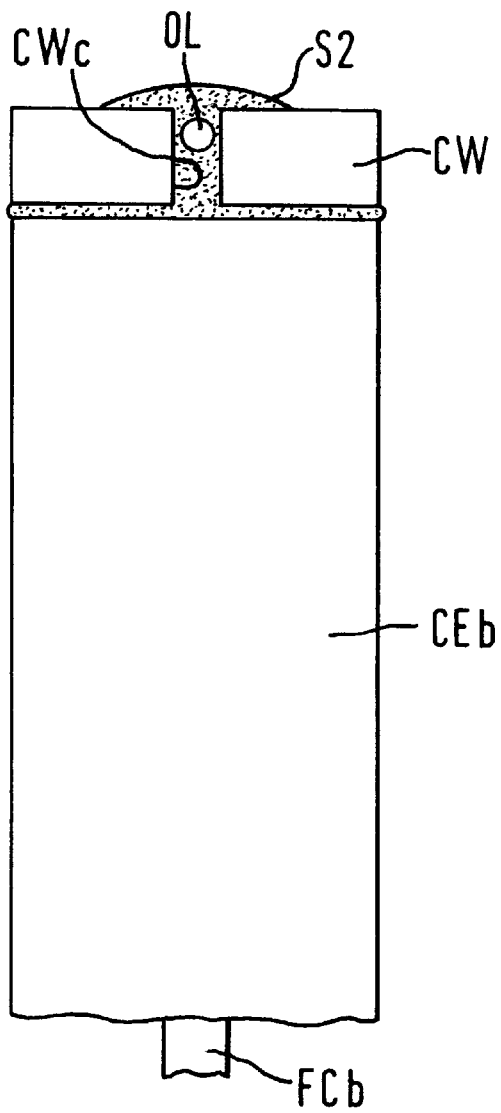
FIG. 11 is a partial enlarged vertical section of the upper portion of a sixth embodiment of the high-intensity discharge lamp according to the present invention.

FIG. 11 is a partial vertical section of a sixth embodiment is the principal part enlarged section figure showing the upper portion of the high-intensity discharge lamp to sealed.

In FIG. 11, the same elements as those shown in FIG. 3 are assigned with same marks.

In this embodiment the configuration of the ceramic washer CW differs from those of the other embodiments.

That is, the ceramic washer CW is provided with a slit CWc which reaches the outer surface from the trial hole CWa. Accordingly, after the external lead-wire OL is coupled to the outer protrusion FCa2 of the feed-conductor FC, the ceramic washer CW is placed on a predetermined position ant the outer protrusion FCa2 is covered by the second sealant S2, so as to enhance the coupling operability.

Figure 12:
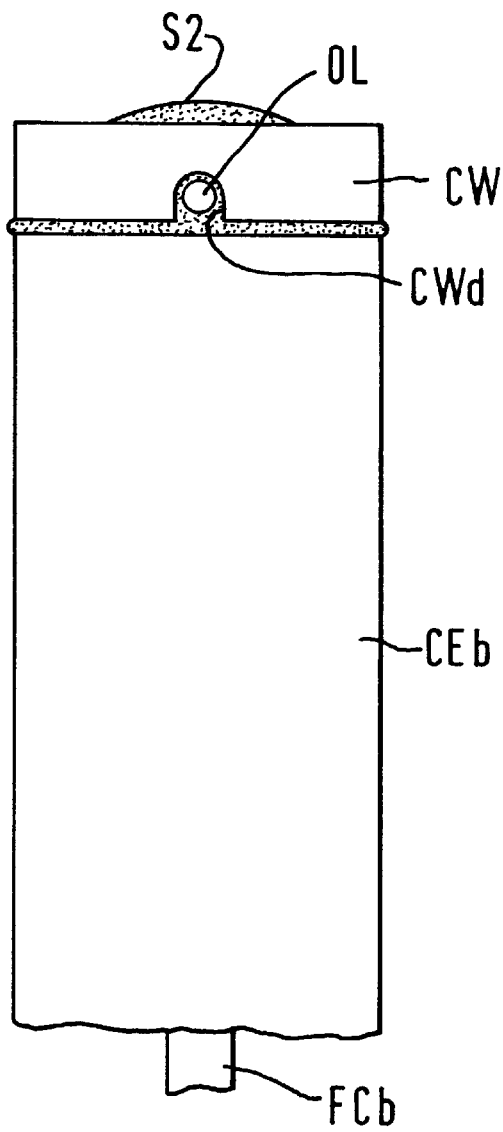
FIG. 12 is a partial enlarged vertical section of the upper portion of a seventh embodiment of the high-intensity discharge lamp according to the present invention.

FIG. 12 is a partial enlarged side view showing the upper portion of a seventh embodiment of the high-intensity discharge lamp according to the present invention.

In FIG. 12, the same elements as those shown in FIG. 3 are assigned with same marks.

In this embodiment, the configuration of the ceramic washer is also different from those of the other embodiments.

That is, a groove CWd is formed on the back of the ceramic washer CW. Accordingly, after the external lead-wire OL is coupled to the outer protrusion FCa2 of the feed-conductor FC, the ceramic washer CW is placed on a predetermined position and the outer protrusion FCa2 is covered by the second sealant S2, so as to enhance the coupling operability.

Figure 13:
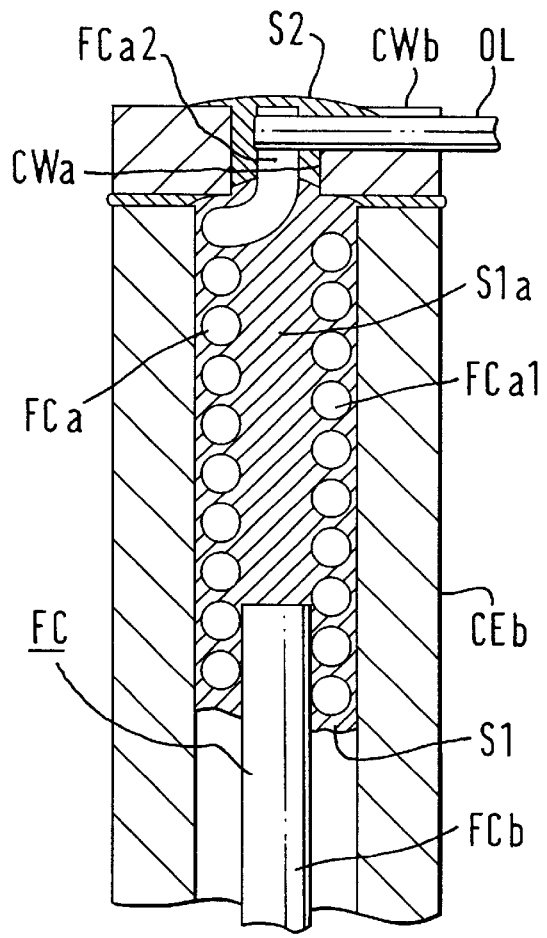
FIG. 13 is a partial enlarged vertical section of the upper portion of an eighth embodiment of the high-intensity discharge lamp according to the present invention.

FIG. 13 is a partial enlarged vertical section of the upper portion of an eighth embodiment of the high-intensity discharge lamp according to the present invention.

In FIG. 13, the same elements as those shown in FIG. 5 are assigned with same marks.

In this embodiment, the configuration of the outer protrusion FCa2 of the sealable portion of the feed-conductor differs from those of the other embodiments.

That is, the sealable portion FCa of the feed-conductor FC is comprised of tho coil portion FCa1 and the outer protrusion portion FCa2 arising from the base end of the coil portion FCa1 Here in the case that one part of the feed-conductor FC is engaged with the tip end of the small diameter cylinder portion CEb for a sealing operation, about one turn of the coil portion FCa1 at the base end could be enlarged to be engaged with.

Then, in this embodiment, it does not need to have any other parts as the outer protrusion FCa2 and any other coupling operation, and it could reduce the costs for the parts and the assembling.

Figure 14:
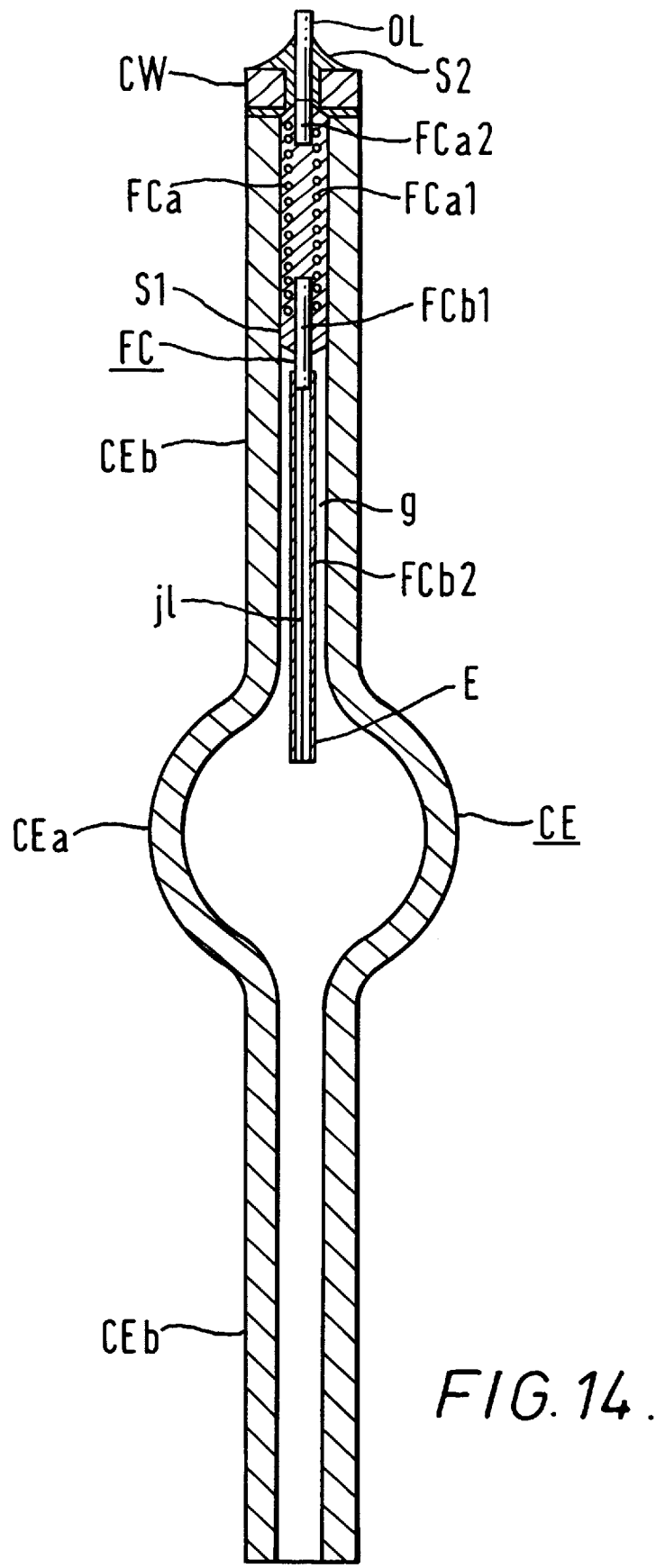
FIG. 14 is a partial vertical section of a ninth embodiment the high-intensity discharge lamp with its upper portion sealed according to the present invention.

FIG. 14 is a partial vertical section of a ninth embodiment the high-intensity discharge lamp with its upper portion sealed according to the present invention;

In FIG. 14, the same elements as those shown in FIG. 2 are assigned with same marks.

In this embodiment, the configurations of principally the refractory portion FCb of the feed-conductor FC, the electrode E and the external lead-wire OL are different from those of the other embodiments.

That is, the refractory portion FCb Is comprised of a molybdenum connecting rod FCb1 of 0.29 mm diameter and 2 mm length, and a tungsten hollow pipe FCb2 of 0.29 mm inner diameter, 50 mm thickness and 7 mm length.

The connection rod FCb1 is coupled to the tip end of the coil portion FCa1 by its bass end being inserted thereto.

The hollow pipe FCb2 is coupled to the connection rod FCb1 by its base end being inserted thereto from outside. The end of the hollow pipe FCb2 functions as the electrode E by residing in the envelope CEa of the discharge lamp light-transmissive ceramic enclosure CE. This hollow pipe FCb2 is made by rounding a tungsten plate to have a junction line j1 with a narrow gap about 20 $\mu$m.

The external lead-wire OL is coupled to the bass end of the outer protrusion FCa2 of the feed-conductor FC in the axial direction, and it extends through the axial hole CWa of the ceramic washer CW.

Figure 15:
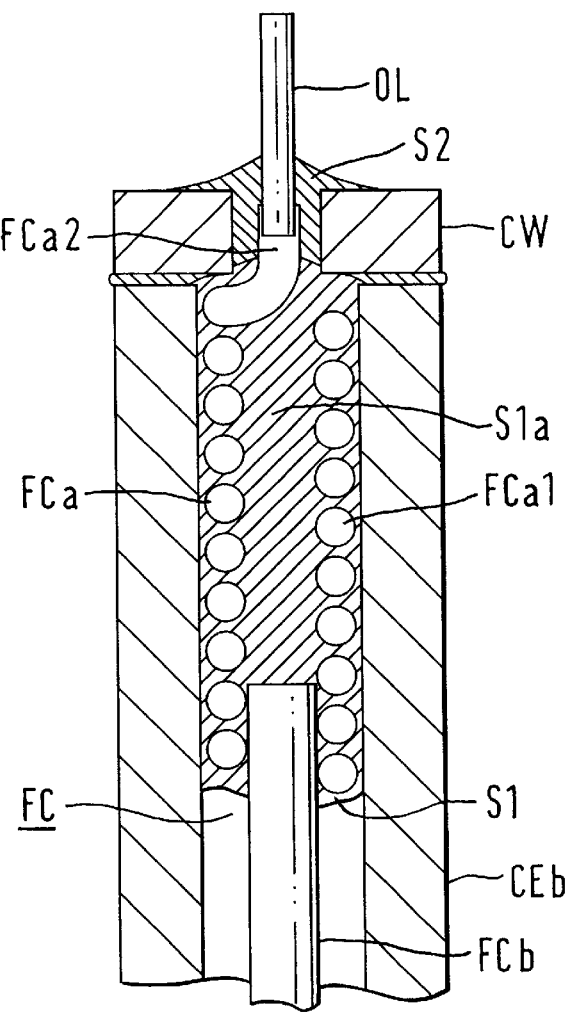
FIG. 15 is a partial enlarged vertical section of the upper portion of a tenth embodiment of the high-intensity discharge lamp according to the present invention.

FIG. 15 is a partial enlarged vertical section of the upper portion of a tenth embodiment of the high-intensity discharge lamp according to the present invention.

Figure 16:
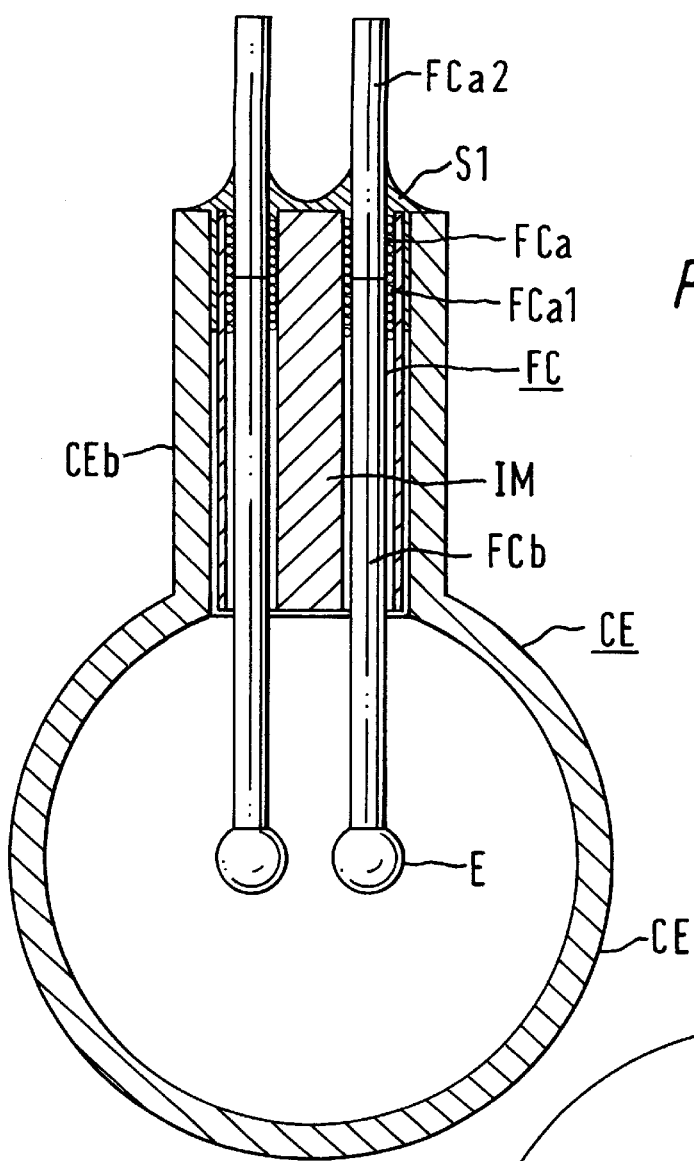
FIG. 16 is a vertical section of the upper portion of an eleventh embodiment of the high-intensity discharge lamp according to the present invention.

In FIG. 16, the same elements as those shown in FIG. 14 are assigned with same marks.

In this embodiment the sealable portion FCa of the feed-conductor FC differs from those of the other embodiments.

That in, the sealable portion FCa is formed by the outer protrusion FCa2 by extending the base and of the coil portion FCa1.

FIG. 16 is a vertical section of a part of an eleventh embodiment of the high-intensity discharge lamp according to the present invention.

Figure 17:
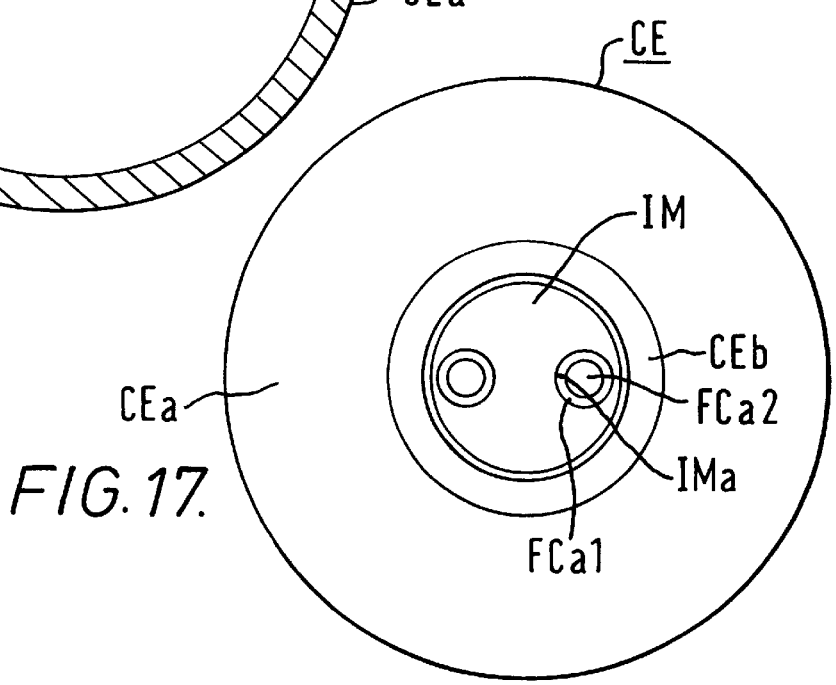
FIG. 17 is a vertical section of the upper portion of the eleventh embodiment of the high-intensity discharge lamp with its upper portion sealed according to the present invention.

FIG. 17 is a plan view showing the state in that the sealant in removed from the upper portion of the high-intensity discharge lamp.

In FIGS. 16 and 17, the same elements as those shown in FIG. 10 are assigned with same marks.

This embodiment differs from other embodiments in that the discharge lamp light-transmissive ceramic enclosure CE is single closed-end structure.

That is, the light-transmissive ceramic discharge enclosure CE have a ball-shape envelope CEa, and a single piece of small diameter cylinder portion CEb is integrally formed on the ball-shape envelope CEa. Then an intermediate member IM is used for desirably departing a pair of the feed-conductors FC, FC in the small diameter cylindrical portion CEb and then sealing them hermetically.

The intermediate member IM is comprised of an aluminum ceramic having a heat coefficient close to the that of the discharge lamp light-transmissive ceramic enclosure CE, and its size is as big as enough to be inserted a gap formed inside of the small diameter cylinder portion CEb, and it is provided with a pair of through-hole. IMa which are separated in parallel in the axial direction. The inner diameter of the through-hole Ma has a inner diameter capable of passing the feed-conductor FC there-through.

The coil portion FCa1 of the sealing portion FCa of the feed-conductor FC in tight-wound.

The electrode E is formed at the tip end of the refractory portion FCb and rounded its tip end.

The sealant S seals a gap between the small diameter cylinder portion CEb of the discharge lamp light-transmissive ceramic enclosure CE and the outer surface of the intermediate member IM, and also a gap between the feed-conductor FC and the through-hole IMa of the intermediate member IM.

Figure 18:
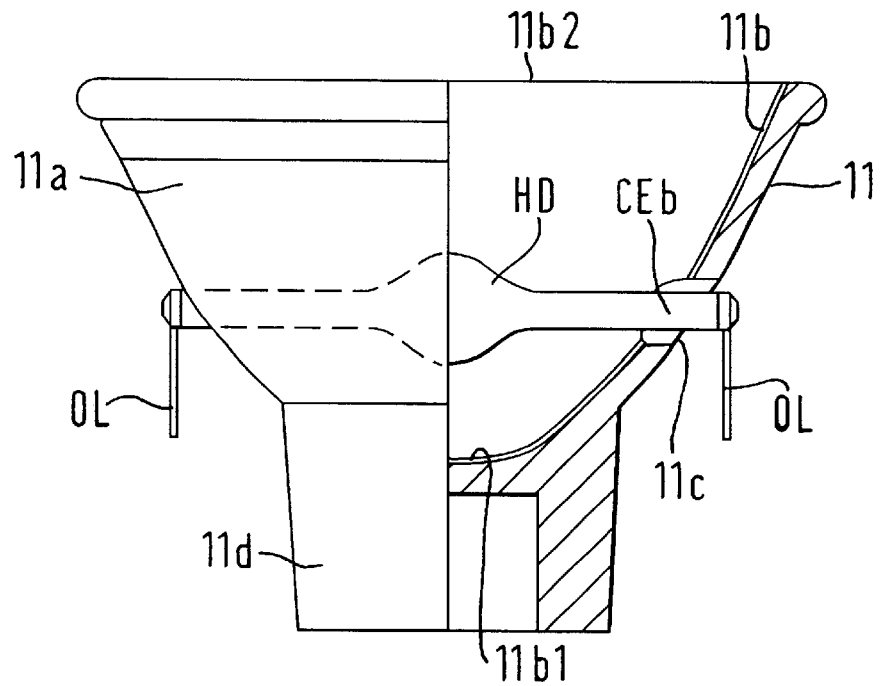
FIG. 18 in a front section of the mid-portion of a first embodiment of the high-intensity discharge lamp according to the present invention.

FIG. 18 is a front section of the mid-portion of a first embodiment of the high-intensity discharge lamp according to the present invention;

In FIG. 18, the same elements as those shown in FIG. 1 are assigned with same marks.

Further, in FIG. 18, HD denotes a high-intensity discharge lamp, and 11 denotes a reflector.

The reflector 11 is provided with a reflector body 11a, a reflection surface 11b, a pair of through-holes 11c, 11e, and a support base 11d.

The reflector body 11a is formed in integral with the support base 11d by using a glass, and provided with a top portion 11a1 and a light projection opening 11a2.

The reflection surface 11b has a rotating parabolic surface shape, and is formed by evaporating an aluminum on the inner surface of the reflector body 11a.

A pair of the through-holes 11c, 11c are formed on the reflection surface 11b at positions confronting the focus point of the reflection surface 11b, and communicating the interior of the reflector 11 to the outside of the reflector body 11a.

The support bass 11d is formed on the back of the based body 11a by confronting to the front-edge 11b1 of the reflector 11b, and formed in a cylindrical shape.

Then, a pair of the small diameter cylinder portion CEb of the high-intensity discharge lamp HD is inserted to a pair of the through-holes of the reflector 11, while the principal parts of the first and the second sealants fail to be exposed to the aide of the reflection surface 11b of the reflector 11.

Figure 19:
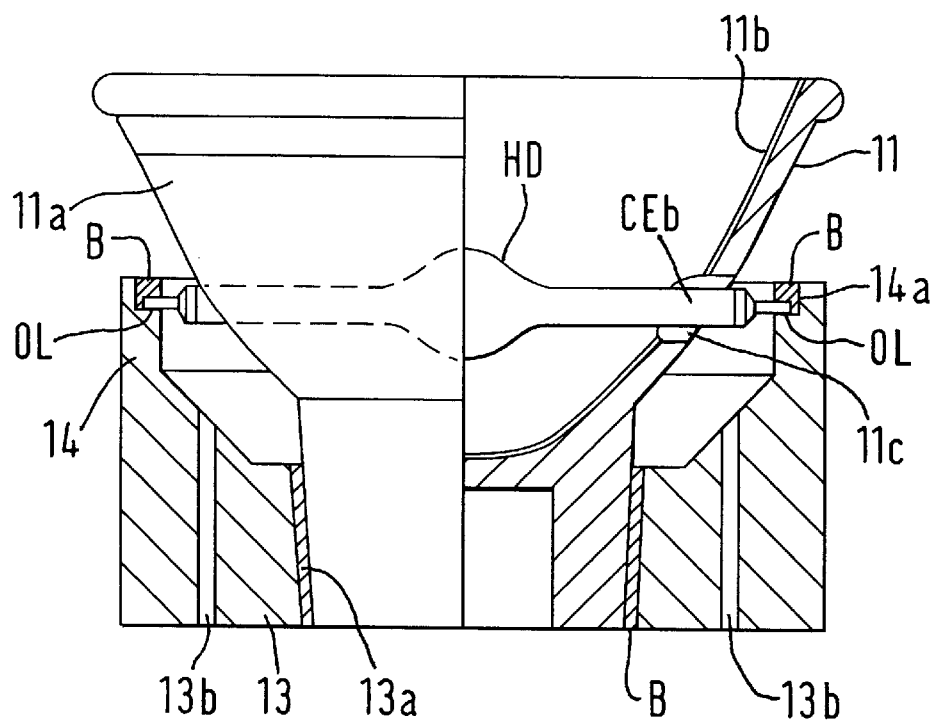
FIG.19 is a front section of the mid-portion of a second embodiment of the high-intensity discharge lamp according to the present invention.
Figure 20:
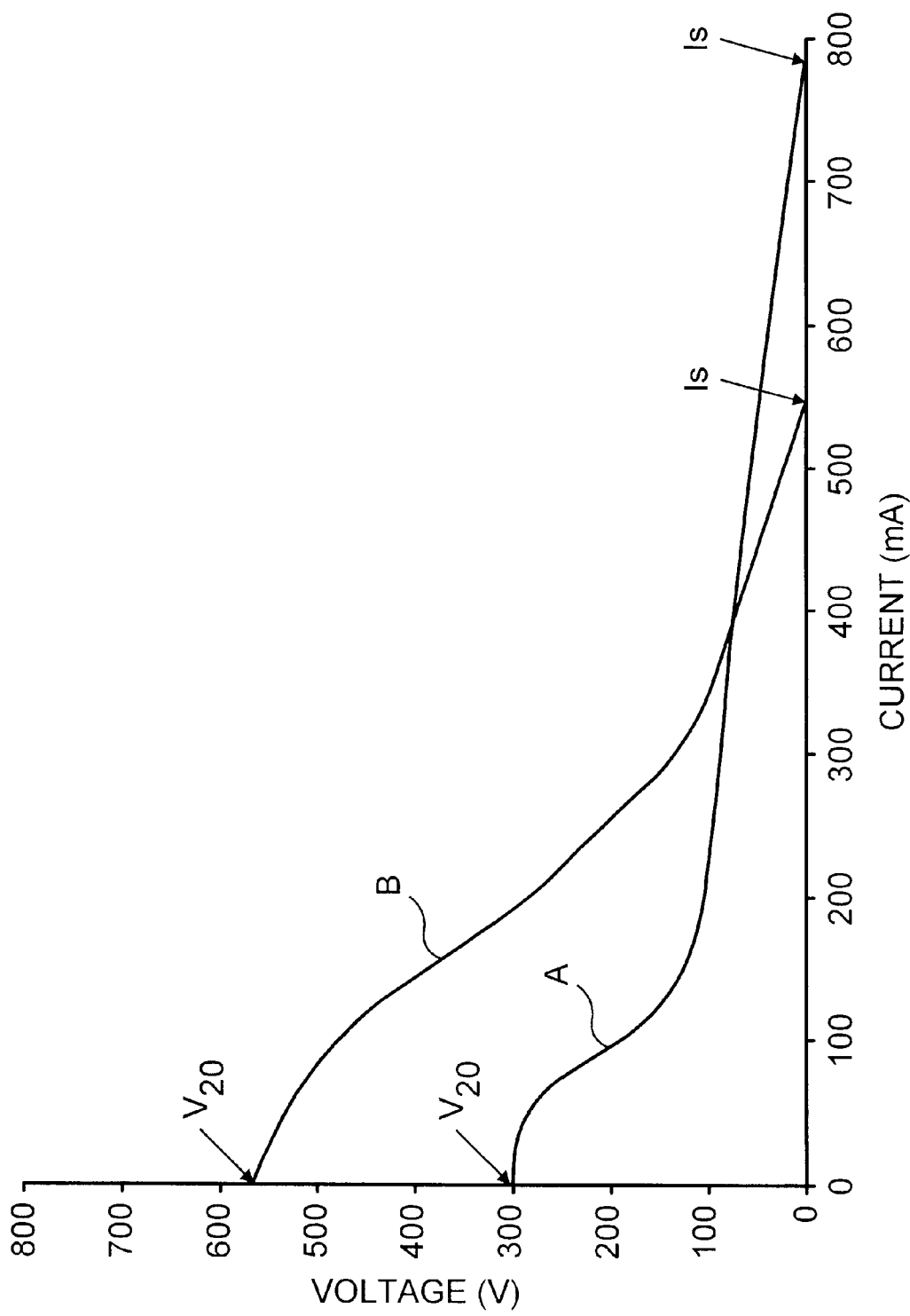
FIG. 20 is a graph illustrating load characteristics of a high-intensity discharge lamp and a fluorescent lamp stabilizer.

FIG. 19 is a front section of the mid-portion of a second embodiment of the high-intensity discharge lamp according to the present invention;

In FIG. 19, the same elements as those shown in FIG. 18 are assigned with same marks.

This embodiment differs from other embodiments by support mechanisms of the high-intensity discharge lamp HD and the supporting system of the reflector 11.

That is, a support base 13 is provided for supporting the reflector 11, and a protector 14 is provided for protecting the high-intensity discharge lamp HD and the reflector 11.

Further, the high-intensity discharge lamp HD is provided with the same configuration as that shown in FIG. 14, and the external lead-wire OL extends in the axial direction of the discharge lamp light-transmissive ceramic enclosure CE.

The support base 13 and the protection means 14 are formed integrally by using a steatite.

The support base 13 is provided with a recesses 13a and a conductive-wire path 13b on its center. The support base 11d of the reflector 11 is accommodated in the recess 13a and then fixed thereto by an inorganic adhesive B. To the conductive-wire path 18b, inserted a conductive-wire (not shown) to be coupled to the external lead-wire OL of the high-intensity discharge lamp HD.

The protector 14 cylindrically arises from the edge of the support base 13 so as to envelope a charger section of the high-intensity discharge lamp HD and the outer surface of the reflector 11. The protector 14 is also provided with a pair of recesses 14a, 14a for receiving the external lead-wires OL.

The external lead-wires OL of the high-intensity discharge lamp HD fits into the recesses 14a, and then fixed to the protector 14 by the inorganic adhesive B.

Now, a first embodiment of the high-intensity discharge lamp according to the present invention will be explained.

The high-intensity discharge lamp is identical, with the high-intensity discharge lamp shown in FIG. 1. The high-intensity discharge lamp has following requirements.

Discharge lamp light-transmissive ceramic enclosure: Made of YAG; Length 25 mm; Hollow portion 1a with Outer diameter 5 mm and Inner diameter 4.5 mm (Wall thickness 0.5 mm); Small-diameter cylinder portion 1b with Outer diameter 1.8 mm, and Inner diameter 0.75 mm (Wall thickness 0.53 mm)

Electrode: Diameter 0.25 mm; Distance of Electrodes 3 mm

Lead-Conductor: Made of niobium; Diameter 0.64 mm

Narrow gap g: 0.25 mm

Figure 25:
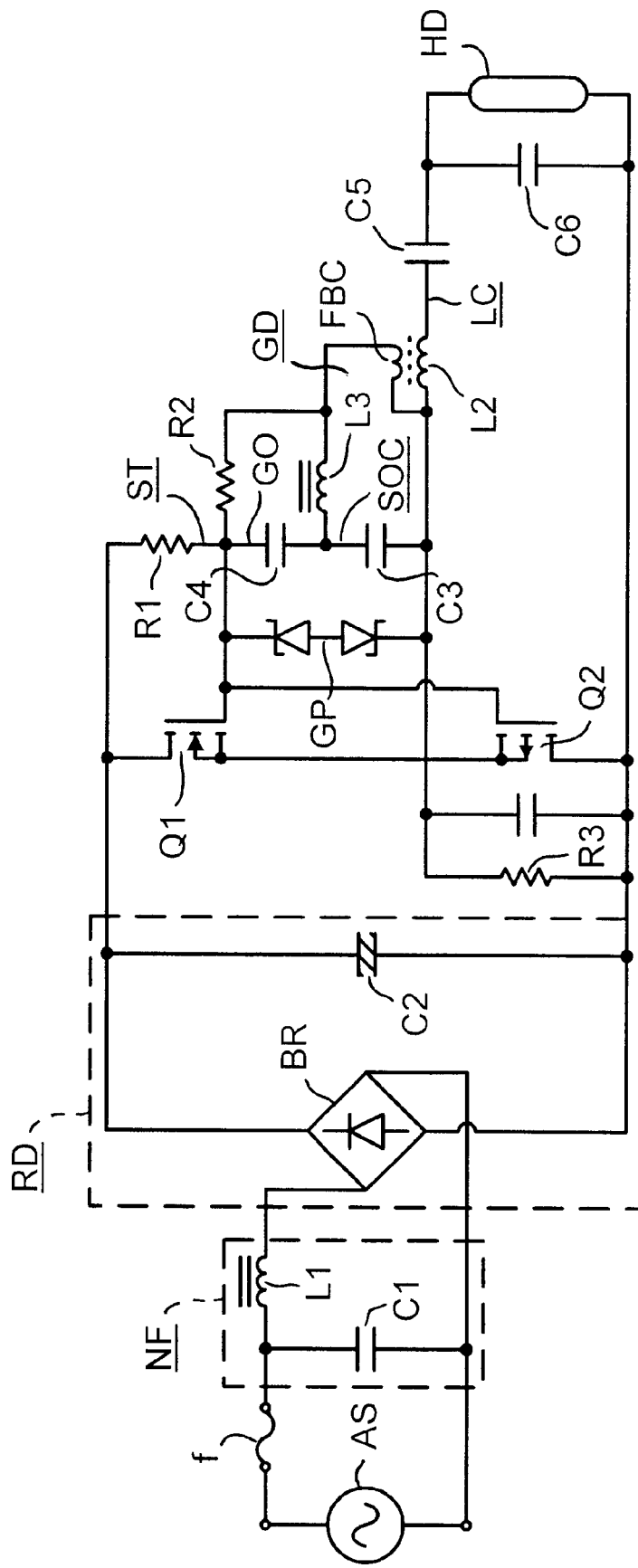
FIG. 25 is a t diagram of a stabilizer in a first embodiment of the high-intensity discharge lamp lighting circuit according to the present invention.

Discharge agent Ne 3%+Ar 500 torr Buffer gas; and Proper quantity of mercury and halogen Lamp power: 20 W Stabilizer: identical to the stabilizer as shown in FIG. 25. Their details will be described later.

Figure 21:
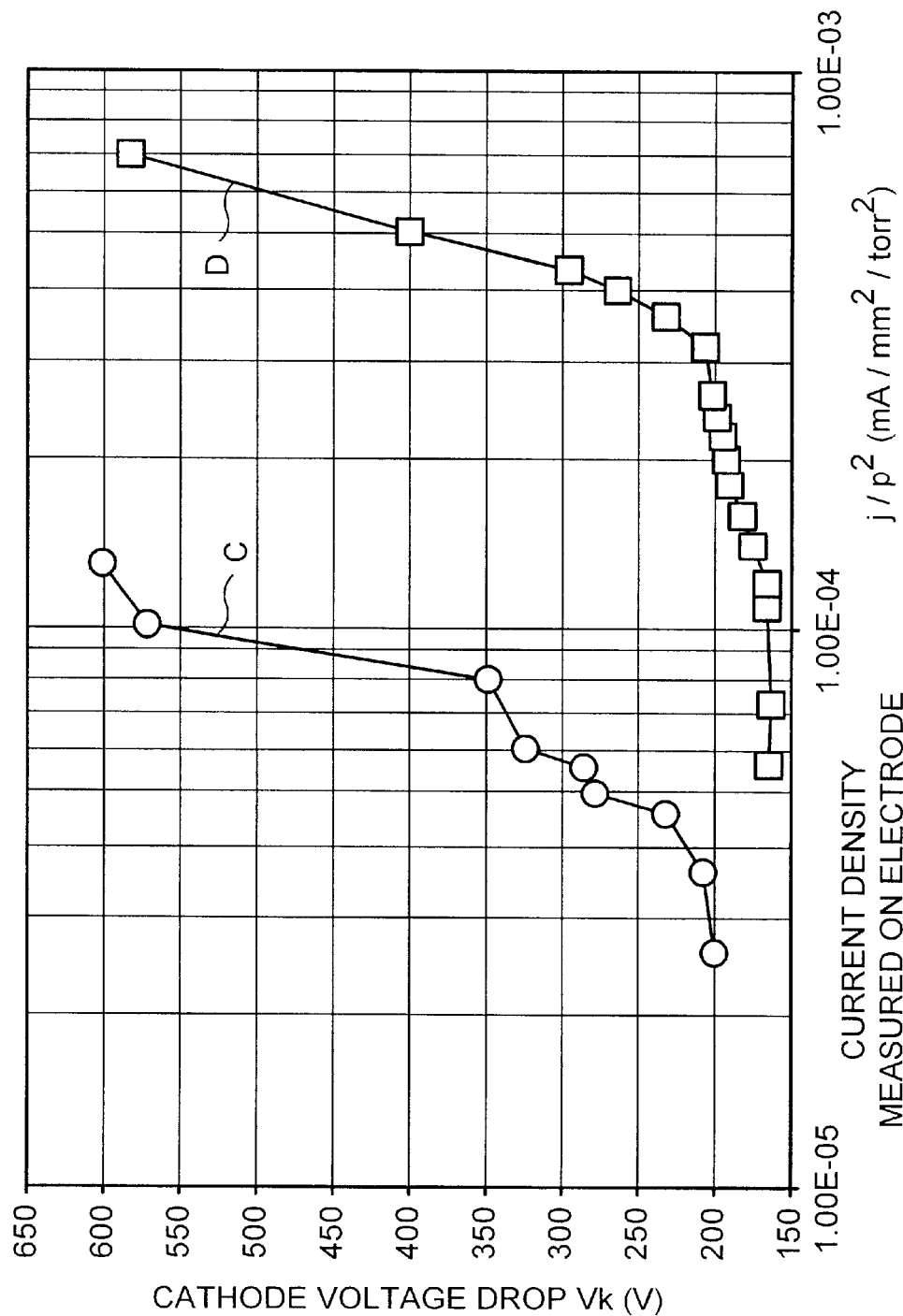
FIG. 21 is a graph illustrating a relationship between a current density measured on electrode and a discharge starting voltage of a first embodiment of the high-intensity discharge lamp device according to the present invention and a comparative example.

FIG. 21 is a graph illustrating a relationship between a current density measured on electrode and a discharge starting voltage of a first embodiment of the high-intensity discharge lamp device according to the present invention and a comparative example.

FIG. 21, the horizontal axis shows a current density measured on electrode $j/p^2$ ($mA/mm^2/torr^2$), and the vertical as shows a cathode voltage drop Vk (V). The characteristic curve C is the present embodiment, and the characteristic curve D is the comparative example. Here, the comparative example is almost the same as the present embodiment, except that the buffer gas is comprised of only the argon.

As seen from the graph of FIG. 21, when the buffer gas is a mixture of a neon and an argon, the current density measured on electrode shrinks and the glow power decreases.

Figure 22:
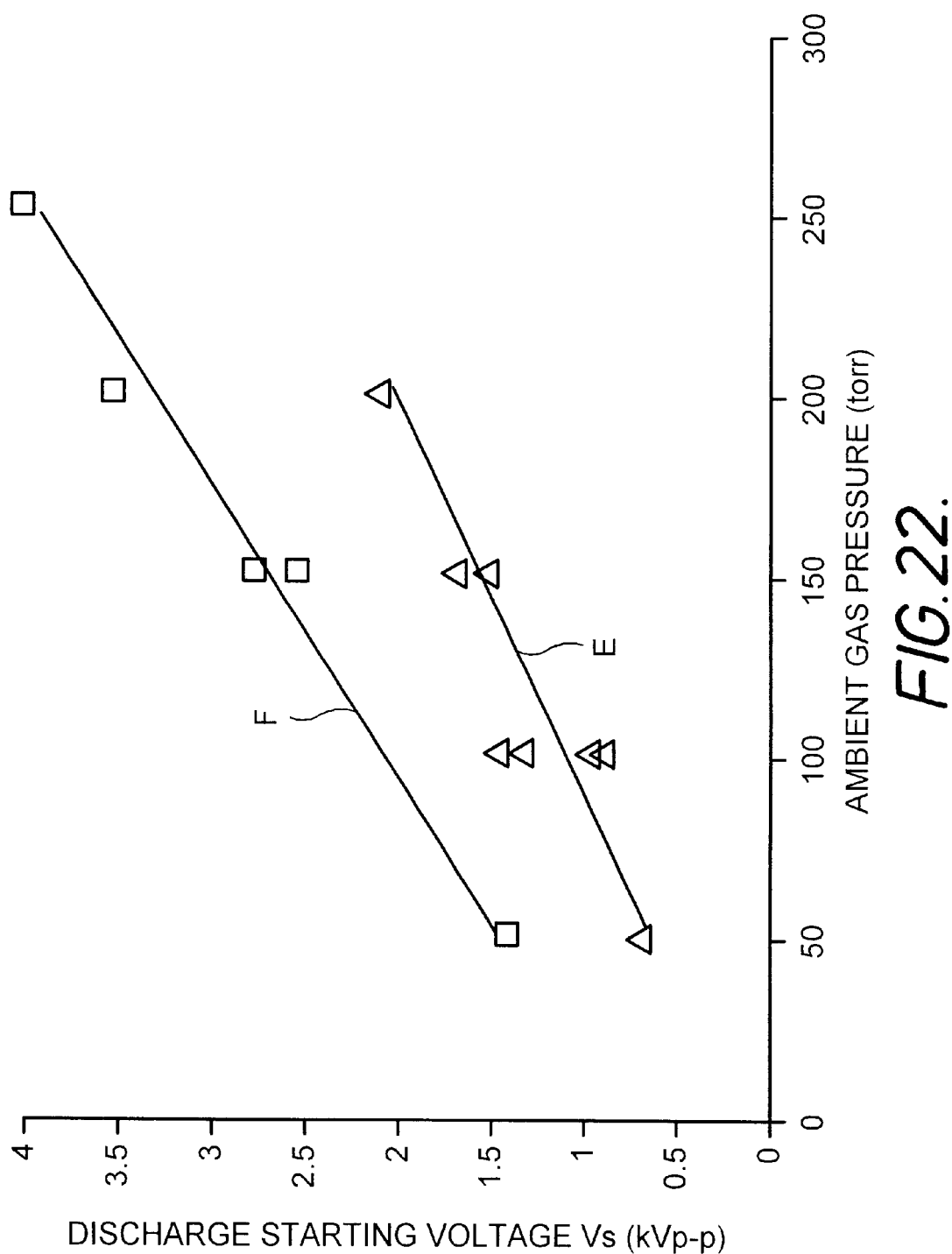
FIG. 22 is a graph showing a relationship between an ambient gas pressure and a discharge starting voltage of the first embodiment of the high-intensity discharge lamp device according to the present invention and a comparative example.

FIG. 22 is a graph showing a relationship between an ambient gas pressure and a discharge starting voltage of the first embodiment of the high-intensity discharge lamp device according to the present invention and a comparative example.

In FIG. 22, the vertical axis shows the ambient gas pressure (torr), and the horizontal axis shows the discharge starting voltage Vs (V). The characteristic curve E is the present embodiment, and the characteristic curve F is the comparative example. Here the comparative example is the identical to the comparative example shown in FIG. 3.

Figure 23:
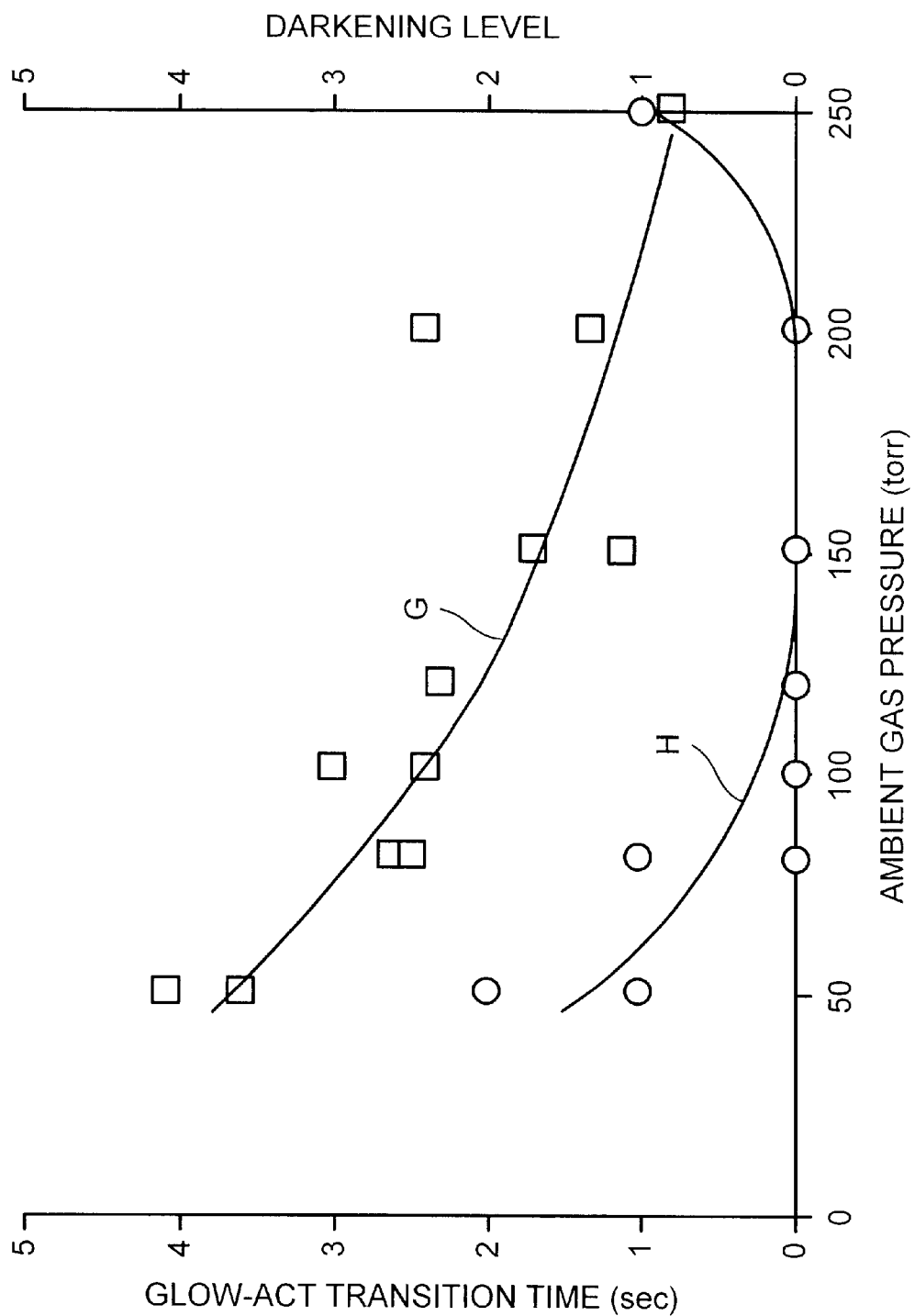
FIG. 23 is a graph showing the relation among an ambient gas pressure, a glow-arc transition time and a blackening degree of the high-intensity discharge lamp of the first embodiment in the high intensity discharge lamp lighting circuit according to the present invention.

As seen from the graph of FIG. 22, when the buffer gas is comprised of a mixture of a neon and an argon, the discharge starting voltage decreases lower than that in the buffer gas comprised of only the argon, FIG. 23 is a graph showing the relation among an ambient gas pressure, a glow-arc transition time and a blackening degree of the high-intensity discharge lamp of the first embodiment in the high-intensity discharge lamp lighting circuit according to the present invention.

In FIG. 23, the vertical as shows the ambient gas pressure (torr). While the left of the vertical axis shows the glow-arc transition time (see), and the right of the vertical at shows a blackening level. The characteristic curve G shows the glow-arc transition time, and the characteristic curve H shown the degree of blackening. Here, the degree of blackening is obtained by a luminosity evaluation, and the higher the value is, the heavier the blackening in.

The graph is plotted by measuring the glow-arc transition time and the blackening degree of the high-intensity discharge lamp which ambient gas pressure varies when the buffer gas is comprised of a mixture of a neon and an argon.

An seen from the graph of FIG. 23, the ambient gas pressure is optimal in the range of 100 to 200 torr.

Figure 24:
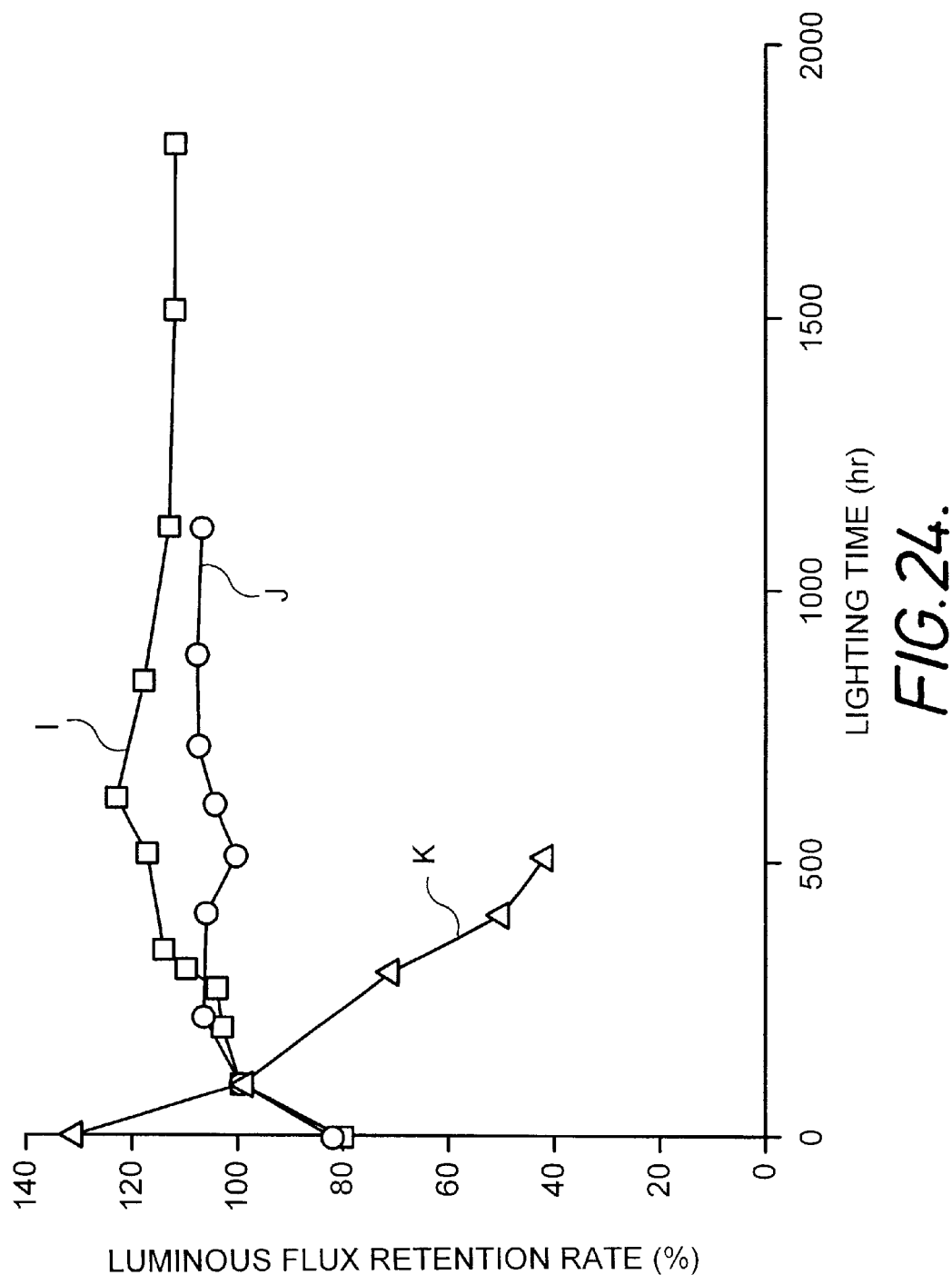
FIG. 24 is a graph showing characteristics of a luminous flux retention to a lighting time of the first embodiment of the high-intensity discharge lamp device according to the present invention and a comparative example.

FIG. 24 in a graph showing characteristics of a luminous flux retention to a lighting time of the first embodiment of the high-intensity discharge lamp device according to the present invention and a comparative example:

In FIG. 24, the vertical axis shown a lighting time (hr), and the horizontal axis shows a luminous flux retention ratio (%). The characteristic curve I is a luminous flux retention ratio characteristics of an example containing 100 torr of a mixture of a on and an argon. The characteristic curve J is a luminous flux retention ratio characteristics of another example containing 150 torr of the mixture. And the characteristic curve K is of a luminous flux retention ratio characteristics of the comparative example containing 100 torr of the argon.

An seen from the graph of FIG. 24, a favorable luminous flux retention ratio characteristics in practical application is obtained by the present invention.

FIG. 25 is a circuit diagram showing a stabilizer in a first embodiment of the high-intensity discharge lamp lighting circuit according to the present invention.

Shown in FIG. 25 is a high-intensity discharge lamp lighting circuit using the stabilizer for the fluorescent lamp which is principally constituted of the half bridge high frequency inverter.

In FIG. 25, AS denotes an AC power sources, f denotes an overcurrent protection fuse, NF denotes a noise filter, RD denotes a rectified DC power source, Q1 denotes a first switching device, Q2 denotes a second switching device, GD denotes a gate drive circuit, ST denotes a starting circuit, GP denotes a gate protection circuit, and LC denotes a load circuit.

The AC power source AS is a commercial 100 V power source.

The overcurrent protection fuse f is a print fuse formed on a printed circuit board, and it protects the circuit not to be burnt when an excessive current has flown.

The noise filter NF is comprised of an inductor L1 and a capacitor C1, and eliminates high frequency components occurring with the operation of the high frequency inverter from their leak to the power supply side.

The rectified DC power source RD is comprised of a bridge rectifier BR and a smoothing capacitor C2. AC input terminals of the bridge rectifier BR are coupled to an AC power source A via the noise filter NF and the overcurrent protection fuse f. And DC output terminals are coupled across a smoothing capacitor C2, output a smoothed DC current.

The first switching device Q1 is comprised of an N-channel MOSFET. Then, its drain im coupled to the positive pole terminal of the smoothing capacitor C2.

The second switching device Q2 is comprised of a P-channel MOSFET. Then, its source is coupled to the source of the first switching device Q1, while its drain is coupled to the negative pole terminal of the smoothing capacitor C2.

Accordingly, the first and the second switching devices Q1 and Q2 are coupled in series in order, and their respective terminals are coupled across the output terminals the rectified DC power source RD.

The gate drive circuit GD is comprised of a feedback circuit FBC, a series resonance circuit SOC, and a gate voltage output circuit GO.

The feedback circuit FBC is comprised of an auxiliary winding which is magnetically coupled to a current limiting inductor L2.

The aeries resonance circuit SOC is comprised of a series circuit of an inductor L3 and a capacitor CB. And its two ends are coupled to the feedback circuit FBC.

The gate voltage output circuit GO is constituted for outputting a resonance voltage appearing across the capacitor C3 of the series resonant circuit SO via a capacitor C4. Then, one end of the capacitor C4 is coupled to the coupling node of the capacitor C3 and the inductor L3, and the other end is coupled to the gates of the first and the second switching devices Q1 and Q2. Further, the other end of the capacitor C3 is coupled to the sources of the first and the second switching devices Q1 and Q2. Accordingly, the resonance voltage applied to both ends of the capacitor C3 is applied across the gates and the sources of the first and the second switching devices Q1 and Q2 via the gate voltage output circuit GO.

The starting circuit ST is comprised of resistors R1, R2 and R3.

One end of the resistor R2 is connected to the positive terminal of the smoothing capacitor C2, an& the other end is connected to the gate of the first switching device Q1 and to one and of the resistor R2 and to the output end at the side of the gate of the gate, voltage output circuit GO of the gate driving circuit GD, i.e., the other end of the capacitor C4.

The other and of the resistor R2 is connected to the connection node of the inductor L3 of the series resonance circuit SOC and the feedback circuit FBC, One end of the resistor R3 is connected to both of the first and the second switching devices Q1 and Q2, i.e., the sources of the switching devices Q1 and Q2 and the source of the gate voltage output circuit GO. While the other end of the resistor R3 is connected to the negative terminal of the smoothing capacitor C2.

The gate protection circuit GP in comprised of a pair of zener diodes connected in series and their opposite pole terminals connected each other, and is connected in parallel to a gate voltage output circuit GO.

The load circuit LC is comprised of a series circuit of the high-intensity discharge lamp, the current limiting inductor L2 and a DC-blocking capacitor C5, and a resonance capacitor C6 which is connected in parallel to the high-intensity discharge lamp HD. One end of the load circuit LC is connected to the connection node of the first and the second switching devices Q1 and Q2, and the other end is connected to the drain of the second switching device Q2.

The high-intensity discharge lamp HD is constituted as shown in FIG. 1, and having the above-described specification.

The current limiting inductor L2 and the resonance capacitor C6 form together a series resonance circuit. Here, the DC-blocking capacitor C5 has a large capacitance, and thus does not significantly affect to the series resonance.

A capacitor C7 connected across the drain and the sources of the second switching device Q2 reduces a load during the switching operation of the second switching device Q2.

Mow, the circuit operation will be explained.

When the AC power source AS is powered-on, the DC voltage smoothed by the rectified DC power source RD appears across the smoothing capacitor C2. Then, the DC voltage is applied between both drains of the first and the second switching devices Q1 and Q2 which is connected in serial. However, both switching means Q1 and Q2 are turned off since the gate voltage is not applied.

Since the DC voltage as mentioned above is applied to the starting circuit ST at the same time, the voltage according to the proportional distribution of the resistance of the resistor R1, R2 and R3 principally is applied to both ends of the resistor R2. Then, the terminal voltage of the resistor R2 in applied to between gate and the source of the first and the second switching device Q1 as the positive voltage.

As the result, since the first switching device Q1 is set to excess the threshold voltage it turns-on. However, since the voltage applied across the gate and the source of the second witching device Q2 has a polarity reversed to the gate voltage, the second switching device Q2 stays in a turned-off state.

When the first switching device Q1 tuns-on, a current flown to the load circuit LC from the rectification DC supply RD via the first switching device Q1. Accordingly, the higher resonance voltage appears across the terminals of the resonance capacitor C6 due to the resonance of the series resonance circuit of the current limiting inductor L2 and the resonance capacitor C6, and then the resonance voltage is applied to the high-intensity discharge lamp ED.

On the other hand, by the current flowing in the current limiting inductor L2 a voltage in induced in the feedback circuit FBC which magnetically couples to the current limiting inductor L2. Accordingly, since a boosted negative voltage is generated in the capacitor C3 by the series resonance of the series resonance circuit SOC, the voltage is clipped to a fixed voltage in the gate protection circuit GP, and applied across the gate and the source of the first and the second switching devices Q1 and Q2 via the gate voltage output circuit GO.

Since the clipped fixed voltage exceeds the threshold voltage of the second switching device Q2, the second switching device Q2 turns-on, On the contrary, the first switching device Q1 turns-off since the gate voltage is reversed its polarity.

When the second switching device Q2 turns-on, an electromagnetic energy stored in the current limiting inductor L2 of the load circuit LC and a charge stored in tho capacitor C6 are released, and a current flows in the reverse direction in the load circuit from the current limiting inductor L2 LC via the second switching device Q2. Then a reverse polarity of a high resonant voltage appears across the capacitor C6 and then applied to the high-intensity discharge lamp HD. Hereinafter, the operations as mentioned above is repeated.

By the way, since the half bridge high frequency inverter operates at the frequency which is relatively close to the resonance frequency of the series resonance circuit comprised of the current limiting inductor L2 and the capacitor C6, before the high-intensity discharge lamp HD start, the second-order open-circuit voltage is about 550 V (effective voltage). That is, the second-order open-circuit voltage is about 1.5 kV p-p, and set to the voltage almost same as the discharge starting voltage of the high-intensity discharge lamp HD. Further, since the second-order short-circuit current is about 550 mA, the load characteristics smoothly extends from the second-order open-circuit voltage to the second-order short-circuit current, in similar to the characteristic curve B in FIG. 1.

Accordingly; even if the igniter for generating the pulse voltage would not be used, the high-intensity discharge lamp HD will starts lighting in a short time. After a certain time, the glow-arc transition occurs, and then the rated lamp current value on the load characteristics graph moves to an operating point so as that the high-intensity discharge lamp HD starts a stable lighting. Here, as the high-intensity discharge lamp HD has the configuration, as shown in FIG. 1, the blackening hardly occurs at the starting operation.

Figure 26:
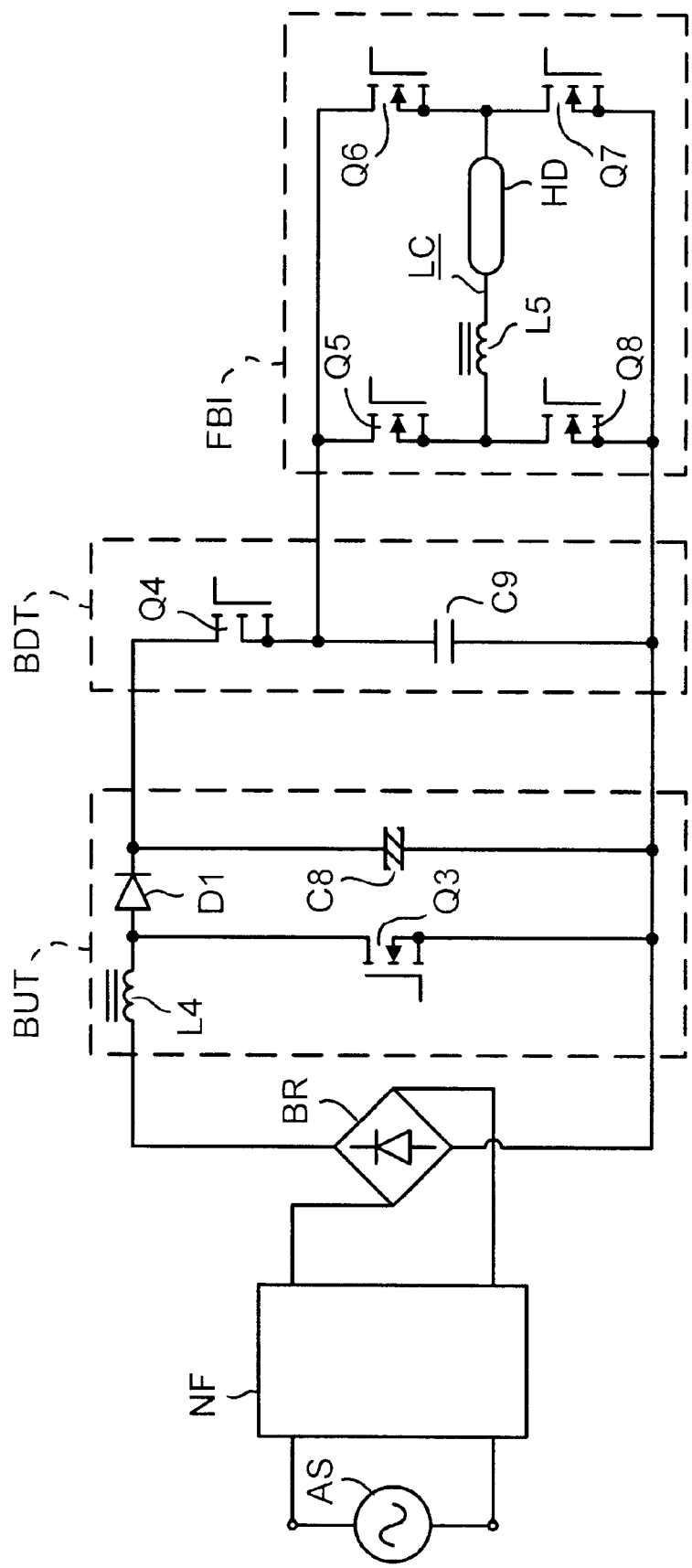
FIG 26 is a block diagram showing a stabilizer for use with a second embodiment of the high-intensity discharge lamp lighting circuit according to the present invention.

FIG. 26 is a block diagram showing a stabilizer for use with a second embodiment of the high-intensity discharge lamp lighting circuit according to the present invention.

In FIG. 26, the same elements as those shown in FIG. 25 are assigned with same marks and omitted the explanation.

This embodiment differs from others in that it is principally constituted by a full-bridge high frequency inverter FBI.

In FIG. 26, BUT denotes a step-up chopper, BDT denotes a step-down chopper, and FBI denotes the full-bridge high frequency inverter.

The step-up chopper BUT is comprised of an inductor L4, a switching device Q3, a diode D1 and a smoothing capacitor C8. A smoothed DC voltage of about 580 V which is boosted over the rectified non-smoothed DC supply voltage appears across the smoothing capacitor C8.

The step-down chopper BDT is comprised of a switching device Q4 and a capacitor C9. The step-down chopper BDT is controlled for performing a constant-voltage-control while changing this output voltage by the integrating operation of the capacitor C9 by making variable the on-duty of the switching device Q4.

The full-bridge high frequency inverter FBI is comprised of four switching devices Q5, Q6, Q7, and Q8 in bridge, and it connects its input terminal to both ends of the capacitor C9 of the step-down chopper BDT and connects the load circuit LC between its output terminal. Here, the inductor L5 of the load circuit LC reduces the peak of the current at the time when the switching device Q3 or Q6 turns-on. In case of the full-bridge inverter, it does not need the current limiting inductor.

The full-bridge high frequency inverter FBI is able to adjust the output voltage by varying the input DC voltage. Then, the full-bridge high frequency inverter FBI outputs about a 580 V at the starting time of the high-intensity discharge lamp HD, and about a 75 V during the lighting operation of the high-intensity discharge lamp HD.

Figure 27:
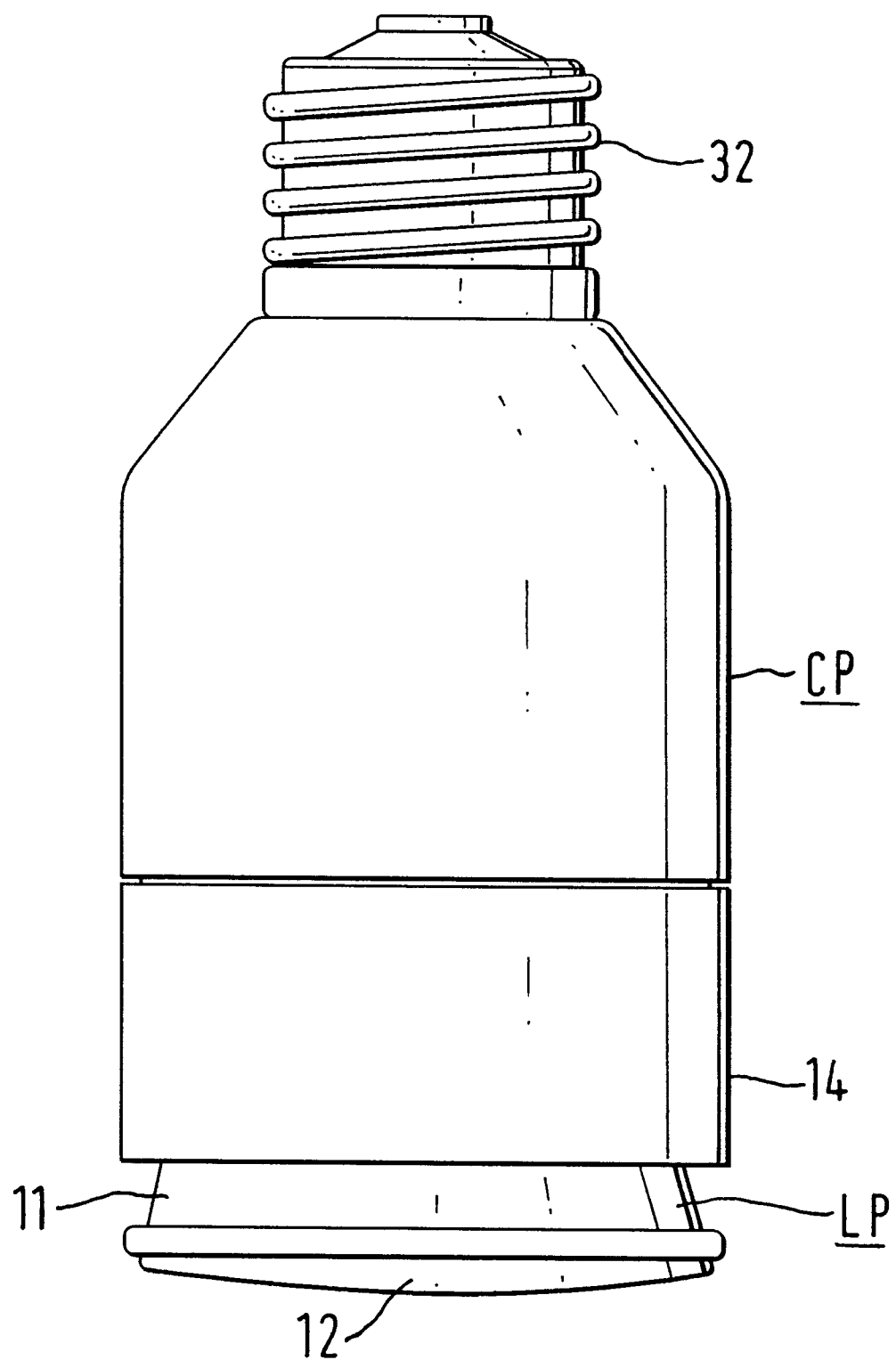
FIG. 27 is a front view of a light bulb type high-intensity discharge lamp as a first embodiment of the lighting equipment according to the present invention.

FIG. 27 is a front view of a light bulb type high-intensity discharge lamp as a first embodiment of the lighting equipment according to the present invention.

Figure 28:
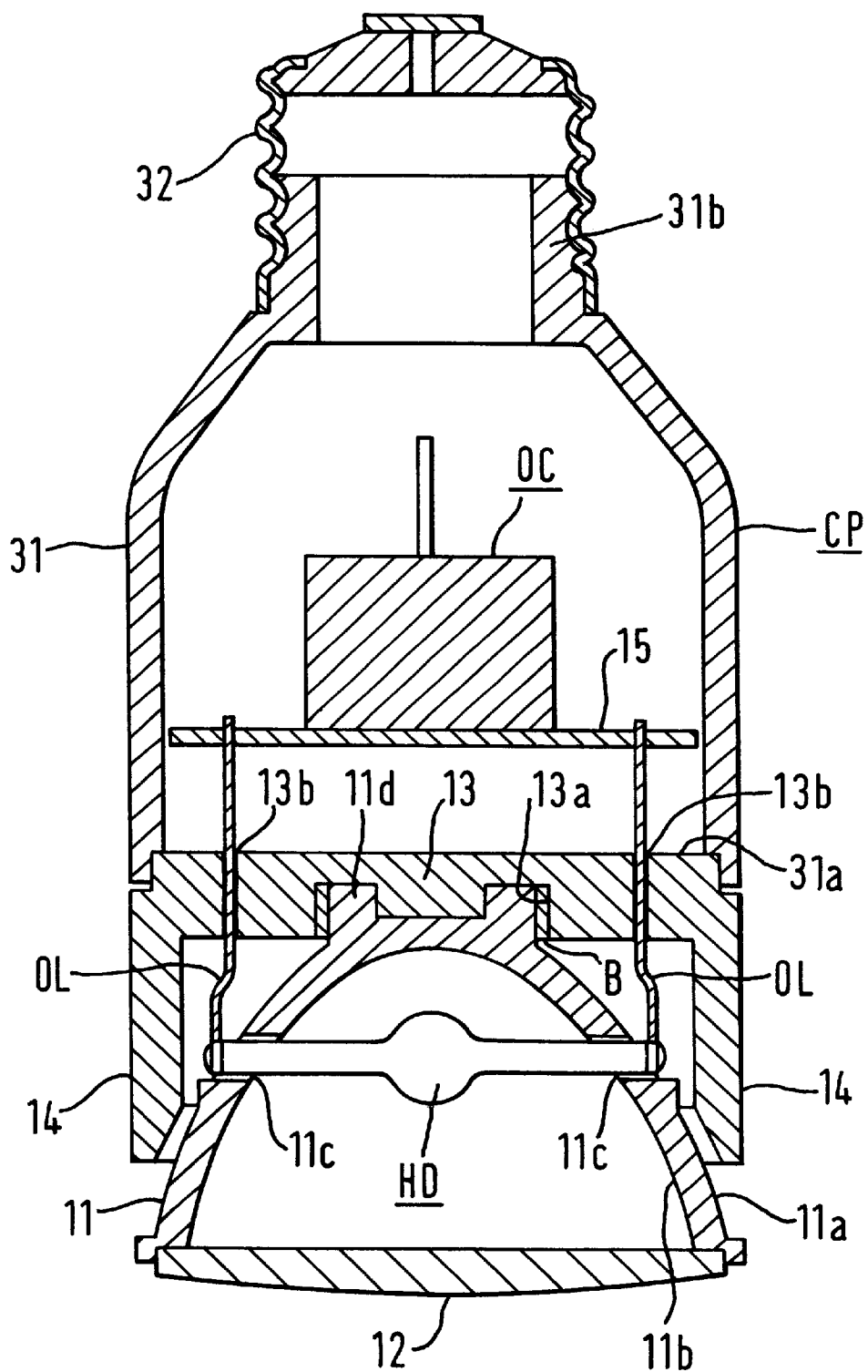
FIG. 28 is a vertical section of the light bulb type high-intensity discharge lamp as the first embodiment of the lighting equipment according to the present invention.

FIG. 28 is a vertical section of the light bulb type high-intensity discharge lamp.

In FIS. 27 and 28, HD denotes the high-intensity discharge lamp, LP denotes a light emitting portion, OC denotes a lighting circuit, and CP denotes a case portion.

<High-intensity Discharge Lamp HD>

The high-intensity discharge lamp HD have the same configuration an that shown in FIG. 1.

<Light Emitting Portion LP>

The light emitting portion LP is provided with a reflector 11, a front protector 12, a support base 13, and a protector 14.

The reflector 11 is comprised of a reflector body 11a, a reflection surface 11b, a through-hole 11c, and a supporting portion 11d.

The reflector body 11c is produced by shaping a refractory body into a concave shape, and its inner surface has a rotating parabolic surface.

The reflection surface 11b is formed by evaporating an aluminum on the inner surface of the reflector body 11a.

The through-holes 11c are formed on both sides of the reflector 11 at positions symmetrical in regard to a line vertically crossing the optical axis of the reflector 11 at a focus point of the reflector 11. The through-holes 11c are provided for receiving portions close to the ends of the small diameter cylinder portions SEb of the discharge lamp light-transmissive ceramic enclosure SE in the high-intensity discharge lamp HD.

The high-intensity discharge lamp HD is defined on the reflector 11 so that its focus point takes it place between the electrodes. In this state, the small diameter cylinder portions SEb, SEb on both edges of the high-intensity discharge lamp HD, while the external lead-wire. OL be exposed outside the reflector 11 through the through-holes 11c.

The supporting portion 11d is formed on the back of the reflector body 11a, and used for supporting the reflector 11.

The front protector 12 is comprised of the transparent heat-resistant substance. The front protector 12 is adhered on the light-projecting opening with a refractory adhesive for closing the light-projecting opening.

The support base 13 is formed like a disc by of a heat-resistant substance such as a heat-resistant resin. The support base 11 is provided with a support groove 13a for receiving a support portion 11d of the reflector 11 and a pair of lead-wire paths 13b and 13b on its front center, Then the supporting portion 11d of the reflector 11 fit in the support groove 13a is adhered to the support groove 13a by an inorganic adhesive B.

This protector 14, comprised of a heat-resistant substance, is formed in integral with the support base 13 so as to arise from the edge of the support base 19. Then, the protector 14 protects the reflector 11 and the bare part of the high-intensity discharge lamp HD which exposes outside by enveloping them.

An external lead-wire OR of the high-intensity discharge lamp HD is led to the back of the support base 13 through the lead-wire path 13b of the support base 13.

<Lighting Circuit OC>

The lighting circuit OC is placed on the back of the light emitting portion LP. Its input terminal is connected to a power receiving means, and its output terminals are connected to the external lead-wires OL of the high-intensity, discharge lamp HD.

Further, the lighting circuit OC is principally constituted of a high frequency inverter mounted on a print circuit board 15.

<Case Portion CP>

The case portion CP is comprised of a ease 31 and a power receiving means 82.

The case 31 is formed into a cylindrical shape by a heat-resistant substance such as the refractory synthetic resin. Its bottom end is provided with an opening 31a which is to be closed by the support base 13 and its top end is provided with a power receiving means mounting portion 31b. Further the case accommodates the lighting circuit OC therein and fixes it thereto.

The power receiving means 32 is comprised of the E26 type bulb-base, and placed on the power receiving means mounting portion 31 of the case 31.

Figure 29:
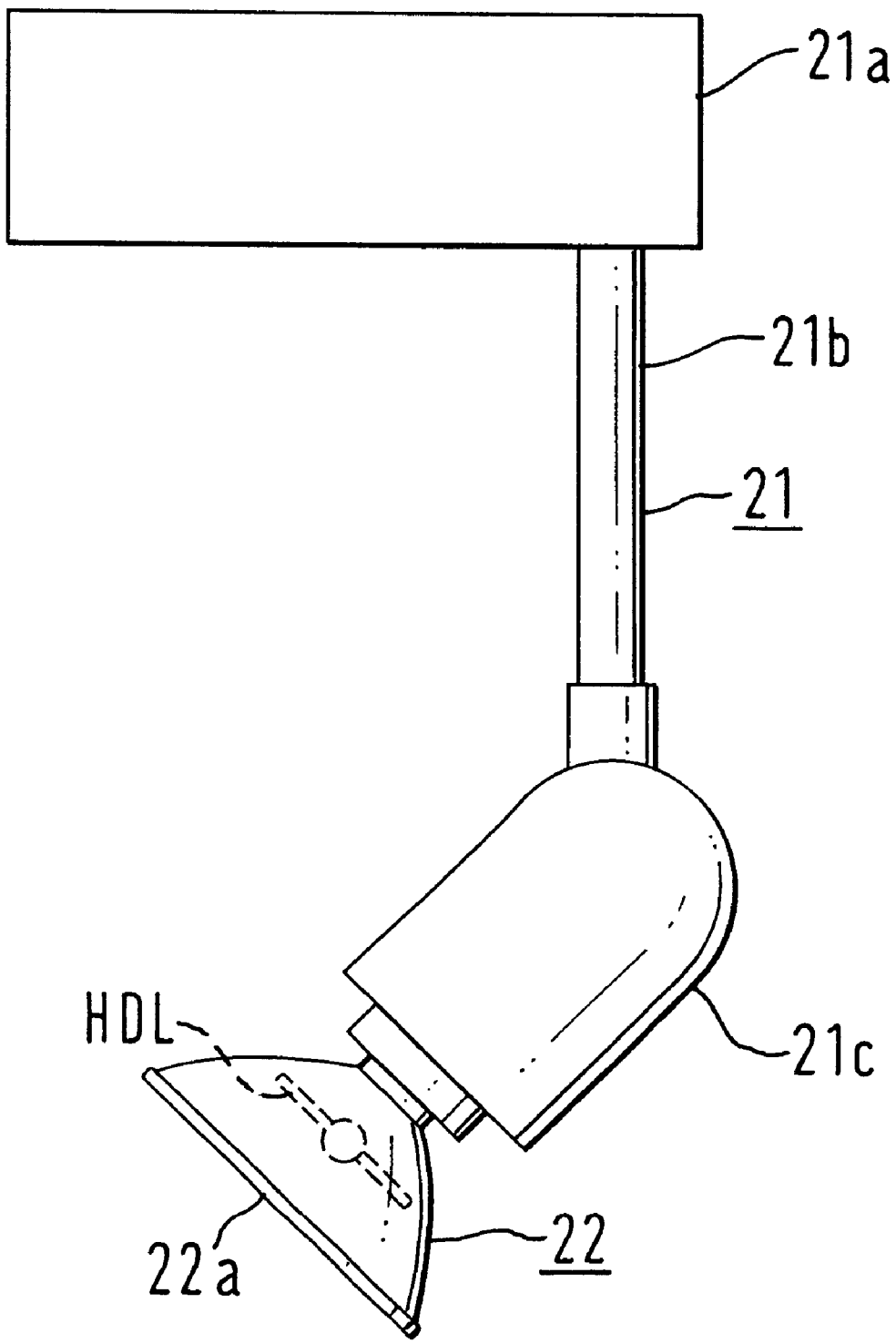
FIG. 29 is a front view of a spotlight type high-intensity discharge lamp as a second embodiment of the lighting equipment according to the present invention.
Figure 30:
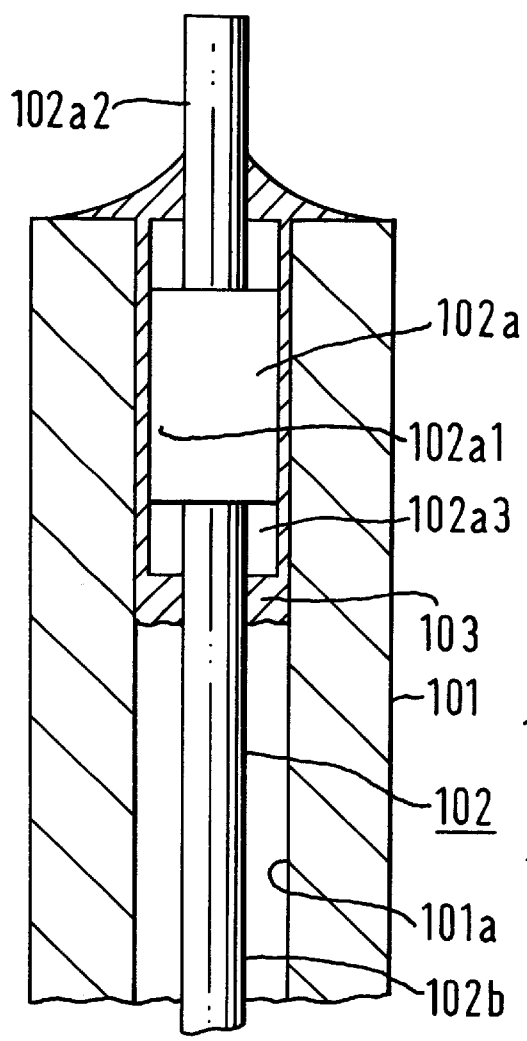
FIG. 30 is a partial enlarged front section of a conventional high-discharge lamp provided with a light-transmissive ceramic enclosure for illustrating a sealing portion of the lamp.
Figure 31:
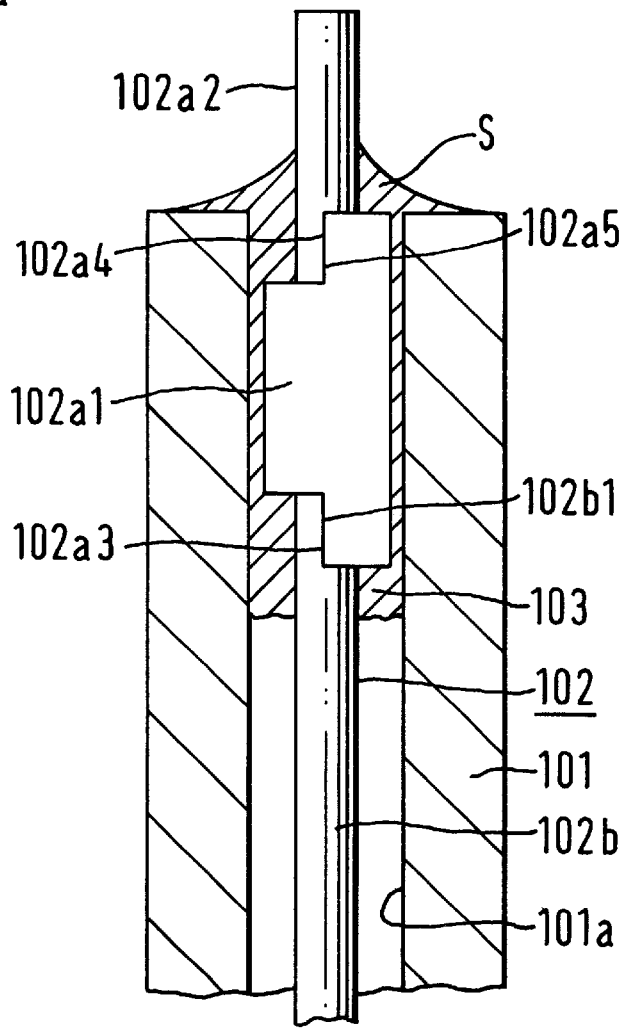
FIG. 31 is another partial enlarged front section of the conventional high-discharge lamp; and PIG. 32 it a partial enlarged section in the high-intensity discharge lamp according to the prior invention high-intensity discharge lamp.
Figure 32:
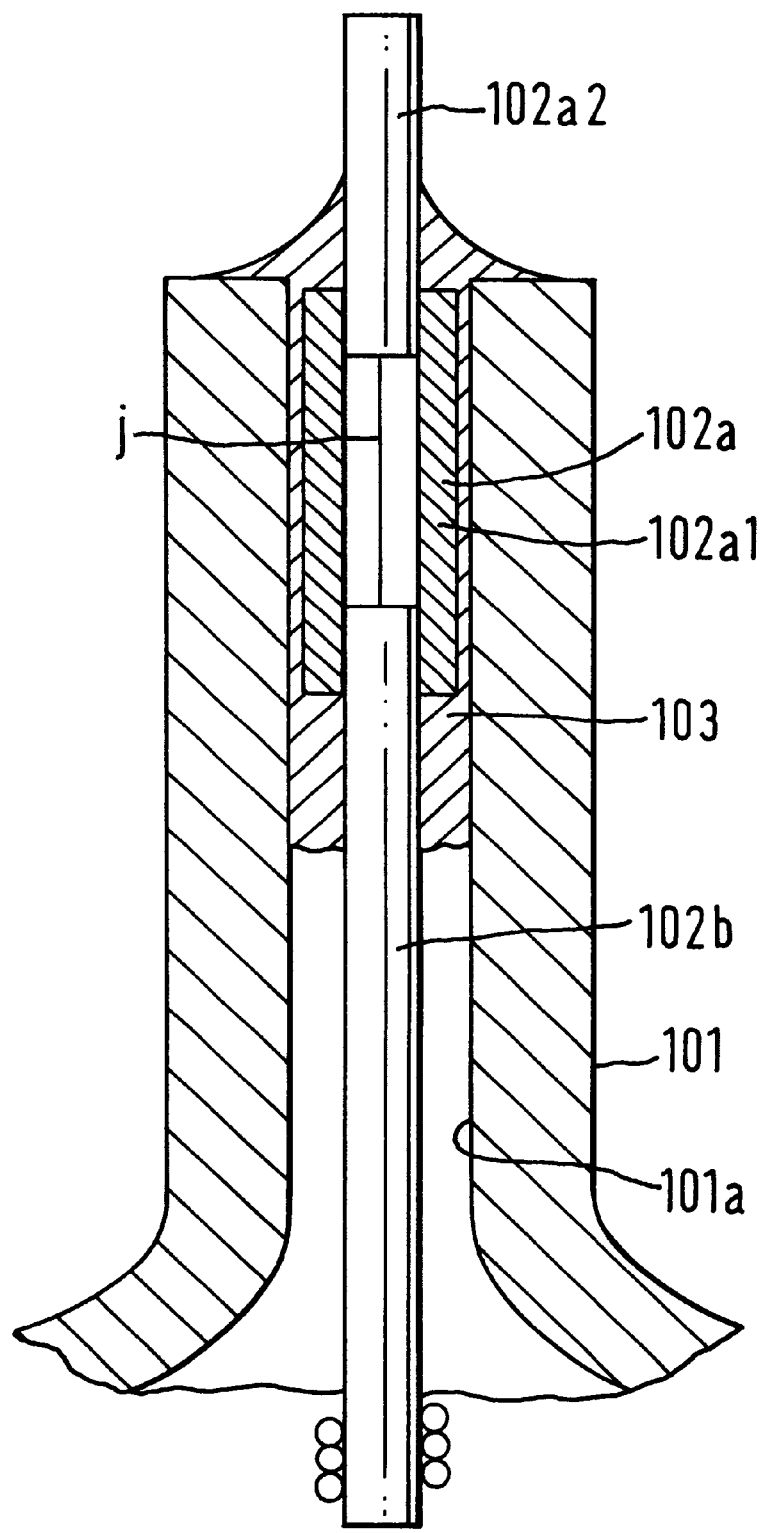

FIG. 29 in a front view of a spotlight type high-intensity discharge lamp as a second embodiment of the lighting equipment according to the present invention.

In FIG. 29, the same elements as those shown in FIG. 28 are assigned with same marks.

In FIG. 29, 31 denotes a lighting system, wile 22 denotes a high-intensity discharge lamp device.

The lighting system main body 21 is provided with a base stand 21a, a pole 21b, and a lighting body 21c.

The base stand 21a is configured to be hanged directly from a ceiling or hanged via the lighting induct, and it is accommodating the discharge lamp lighting circuit (not shown) inside.

The pole 21b supports the lighting body 21c by suspending it from the base stand 21a.

Further the pole 21b accommodates therein an insulator-coated lead-wire (not shown) for connecting the discharge lamp lighting circuit to the light body 21c.

The lighting body 21c accommodates therein a lamp socket (not shown).

The high-intensity discharge lamp device 22 is provided with the high-intensity discharge lamp HD, a reflector 22a and a bulb-base 22b.

Then, when the bulb-base 22b of the high-intensity discharge lamp device 22 is mounted to a lamp socket of the lighting body 21c, the high-intensity discharge lamp HD lights with a high brightness. As, the light beams are condensed by the reflector 22a, it is able to light up a subject with a desirable sharp light intensity distribution.

Hear, it is also possible to be lighted desirably with the halogen lamp as good as the spot light using the halogen lamp.

As described above, the present invention can provide an extremely preferable high-intensity discharge lamp, high-intensity discharge lamp device, high-intensity discharge lamp lighting circuit end lighting system.

According to the inventions of claims 1 and 2, it is possible to provide a high-intensity discharge lamp with a high reliability of sealing. This is accomplished by that a coil portion is formed at a sealable portion of a feed-conductor which is inserted in the small diameter cylinder portion of the discharge lamp light-transmissive ceramic enclosure and sealed by the sealant together with the small diameter cylinder portion. That is also accomplished by making a sealant to enter into the interior of the coil portion, or by inserting a sealable metal rod into the coil portion. Thus the refractory portion and/or the outer protrusion becomes hard to be off-centered from the sealable portion, or a film of the sealant is formed.

According to the invention of claim 1, it is able to provide the high-intensity discharge lamp in which the coil portion is easily coupled to the refractory portion so that they fail to be off-centered from each other.

According to the invention of claim 2, at least the mid-portion of the sealable portion of the feed-conductor is formed as the coil portion. Then it is able to so provide the high-intensity discharge lamp as that the coil portion hardly bends and also hardly off-centered from the sealable portion, by forming a sealing film in the interior of the coil portion to enhance the sealing reliability, or by lodging a sealable metal rod in the interior of the coil portion.

According to the inventions of claims 3 to 6, since it defines the reflector for condensing the light of the high-intensity discharge lamp so as to use the compact high-intensity discharge lamp with about 20 W of the rated consumption power, it is able to provide the high-intensity discharge lamp device which is compact as a whole and performs the light condensing operation desirably.

According to the claim 4, since the high-intensity discharge lamp is mounted on the concave reflector in the way that the principal part of the sealant by the ceramic sealing compound substantially fails to be exposed to the side of the interior of the reflector and the of the high-intensity discharge lamp being orthogonal to the optical axis in addition, as the temperature rise of the sealant of the ceramic sealing compound is minimal, so that it is able to provide the high-intensity discharge lamp with a long life high-intensity discharge lamp even though using the shallow reflector.

According to the invention of claim 5, since the liquid-phase ionization agent which resides in the narrow gap between the small diameter cylindrical portion of the light-discharge lamp light-transmissive ceramic enclosure, and the feed-conductor ham a surface locating at the side of the interior of the reflector, the temperature of the coldest portion rises so that a high-intensity discharge lamp with an enhanced lighting efficiency is able to be obtained.

According to the invention of claim 6, since the reflector is provided with a pair of through-holes at positions symmetrical in regard to a line orthogonal to the optical axis of the reflector at a focus point of the reflector, and a pair of small diameter cylinder portions of the discharge lamp light-transmissive ceramic enclosure is inserted into the through-holes, it is able to provide the high-intensity discharge lamp device with high reflection efficiency of loss non-reflection portion, According to the inventions of claims 7 and 8, the high-intensity discharge lamp in which the neon and the argon are ailed as the buffer gas in the light-discharge lamp light-transmissive ceramic enclosure is lighted using the stabilizer which works at a high frequency, so that it is able to use the compact stabilizer such as the fluorescent lamp stabilizer whose load characteristics smoothly extends from the second-order opening voltage to the second-order short-circuit current, and also able to lessen the current density measured on electrode at the glow discharge operation and the glow power at the glow-arc transition. Accordingly it is able to provide the high-intensity discharge lamp lighting circuit which is hard to cause the blackening caused by the evaporation of the electrode substance at the starting operation.

According to the invention of claim 8, by using the stabilizer principally constituted of the high frequency inverter providing the LC resonance circuit, it is able to provide the very much compact and inexpensive high-intensity discharge lamp lighting circuit of smooth adjustment of the output voltage and simple circuit arrangement.

According to the invention of claim 9, it is able to provide the lighting system performing the effects according to claim 1 or 2.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A high-intensity discharge lamp, comprising:
   a discharge lamp light-transmissive ceramic enclosure having an envelope defining a discharge space and a small diameter cylinder portion communicating with the envelope and having a diameter smaller than the envelope;
   a feed-conductor, which in comprised of a sealable portion including a coil portion, and a refractory portion coupled to the coil portion by inserting its base end into the coil portion, the feed-conductor being inserted into the small diameter cylinder portion of the discharge lamp light-transmissive ceramic enclosure, thus resulting narrow gaps for both the refractory portion and the inner surface of the small diameter cylinder portion;
   an electrode mounted on the end of the refractory portion of the feed-conductor;
   a sealant for sealing gaps between the small diameter cylinder portion of the discharge lamp light-transmissive ceramic enclosure and the sealable portion of the feed-conductor so that at least the sealable portion fails to be exposed to the discharge space; and
   an ionizing agent filled in the discharge lamp light-transmissive ceramic enclosure.

2. A high-intensity discharge lamp, comprising:
   a discharge lamp light-transmissive ceramic enclosure having an envelope defining a discharge space and a small diameter cylinder portion communicating with the envelope and having a diameter smaller than the envelope;
   a feed-conductor having a sealable portion with at least its mid-portion formed in a coil portion and a refractory portion with its base end coupled to the coil portion by inserted thereinto, the feed-conductor then extending into the small diameter cylinder portion of the discharge lamp light-transmissive ceramic enclosure in leaving a narrow gap between the inner surface of the small diameter cylinder portion and the refractory portion;
   an electrode mounted on the and of the refractory portion of the feed-conductor;
   a sealant for sealing a gap between the small diameter cylinder portion of the discharge lamp high-transmissive ceramic enclosure and the sealable portion of the feed-conductor so that at least the sealable portion fails to be exposed to the discharge space; and
   an ionizing agent filled in the discharge lamp light-transmissive ceramic enclosure.

3. A high-intensity discharge lamp assembly, comprising:
   a high-intensity discharge lamp as claimed in claim 1 or 2; and a reflector for condensing the light radiated the high-intensity discharge lamp.

4. A high-intensity discharge lamp device, comprising:

a high-intensity discharge lamp as claimed in claim 1 or 2; and a concave reflector to which the high-intensity discharge lamp is arranged so as that the axis of the lamp nearly intersects the optical axis of the reflector and the principal part of the sealant of the high-intensity discharge lamp fails to be exposed to the side of the interior of the reflector.

5. A high-intensity discharge lamp device as claimed in claim 4, wherein the surface of the liquid phase ionizing agent generated during the operation of the high-intensity discharge lamp operation and residing in the narrow gap between the small diameter cylinder portion of the discharge lamp light-transmissive ceramic enclosure and the feed-conductor places in the interior of the reflector.

6. A High-intensity discharge lamp device as claimed in claim 4 or 5, wherein;

the reflector is provided with a pair of through-holes at positions symmetrical in regard to a line orthogonal to the optical axis of the reflector at a focus point of the reflector; and a pair of small diameter cylinder portions of the discharge lamp light-transmissive ceramic enclosure is inserted into the through-holes.

7. A high-intensity discharge lamp lighting circuit, comprising:

a high-intensity discharge lamp as claimed in claim 1 or 2 in which the ionizing agent contains a neon and an argon as buffer gases; and a stabilizer for lighting the high-intensity discharge lamp at a high frequency region.

8. A high-intensity discharge lamp lighting circuit as claimed in claim 7, wherein the stabilizer is constituted by principally a high frequency inverter provided with an LC resonator.

9. A lighting system, comprising:

a lighting system principal body; and a high-intensity discharge lamp as claimed in claim 1 or 2 which is mounted on the lighting apparatus principal body.

* * * * *